US012477383B2

(12) United States Patent
Wen et al.

(10) Patent No.: US 12,477,383 B2
(45) Date of Patent: Nov. 18, 2025

(54) INFORMATION PROCESSING METHOD, BASE STATION, BEARER NETWORK DEVICE, CORE NETWORK DEVICE, AND MEDIUM

(71) Applicant: ZTE CORPORATION, Shenzhen (CN)

(72) Inventors: Jianzhong Wen, Shenzhen (CN); Aihua Liu, Shenzhen (CN); Ran Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 356 days.

(21) Appl. No.: 18/250,394

(22) PCT Filed: Sep. 1, 2021

(86) PCT No.: PCT/CN2021/115947
§ 371 (c)(1),
(2) Date: Apr. 25, 2023

(87) PCT Pub. No.: WO2022/088951
PCT Pub. Date: May 5, 2022

(65) Prior Publication Data
US 2023/0370891 A1    Nov. 16, 2023

(30) Foreign Application Priority Data
Oct. 26, 2020   (CN) .......................... 202011156816.5

(51) Int. Cl.
*H04W 28/02*   (2009.01)
*H04W 72/21*   (2023.01)
*H04W 72/23*   (2023.01)

(52) U.S. Cl.
CPC ....... *H04W 28/0268* (2013.01); *H04W 72/21* (2023.01); *H04W 72/23* (2023.01)

(58) Field of Classification Search
CPC . H04W 28/0268; H04W 72/21; H04W 72/23; H04W 28/16; H04W 40/248;
(Continued)

(56) References Cited

U.S. PATENT DOCUMENTS 6,286,104 B1 *  9/2001  Buhle .................. H04L 63/105
                                        707/999.009
10,567,276 B2    2/2020  Zhang
(Continued)

FOREIGN PATENT DOCUMENTS

| CN | 107517488 A | 12/2017 |
| CN | 108243106 A |  7/2018 |

(Continued)

OTHER PUBLICATIONS

3GPP Technical Specification Group Radio Access Network. "Study on New Radio Access Technology; Radio Access Architecture and Interfaces," 3GPP TR 38.801, vol. 1.2.0, 2017.
(Continued)

*Primary Examiner* — Brian T O Connor
(74) *Attorney, Agent, or Firm* — Vivacqua Crane, PLLC

(57) ABSTRACT

An information processing method, a base station, a bearer network device, a core network device and a medium are provided. The method may include, acquiring slice service information from a terminal device; sending an uplink slice service packet carrying a network slice identifier and a network slice parameter to a bearer network device, according to the slice service information, so that the bearer network device processes the uplink slice service packet according to the network slice identifier and network slice parameter in the uplink slice service packet, wherein both the network slice identifier and network slice parameter are processable by the bearer network device.

15 Claims, 11 Drawing Sheets

(58) Field of Classification Search
CPC . H04L 41/0806; H04L 41/40; H04L 41/5051; H04L 41/5019; H04L 41/0893; H04L 12/12; H04L 41/0895
See application file for complete search history.

(56) References Cited

U.S. PATENT DOCUMENTS

| | | | | |
|---|---|---|---|---|
| 12,170,953 | B2* | 12/2024 | Chen | H04W 48/18 |
| 12,225,384 | B2* | 2/2025 | Buyukdura | H04L 41/0894 |
| 2018/0270743 | A1* | 9/2018 | Callard | H04W 28/0268 |
| 2019/0124704 | A1 | 4/2019 | Sun et al. | |
| 2019/0289647 | A1 | 9/2019 | Li | |
| 2020/0245381 | A1 | 7/2020 | Talebi Fard et al. | |
| 2020/0259786 | A1* | 8/2020 | Saarinen | H04L 63/0414 |
| 2021/0368429 | A1* | 11/2021 | Xu | H04L 12/4633 |
| 2022/0052945 | A1 | 2/2022 | Peng et al. | |
| 2022/0264357 | A1* | 8/2022 | Poe | H04L 41/5003 |
| 2022/0353138 | A1* | 11/2022 | Wyszkowski | H04L 41/0895 |
| 2022/0386226 | A1* | 12/2022 | Chen | H04L 41/5051 |
| 2023/0308363 | A1* | 9/2023 | Ishii | H04W 48/18 |

FOREIGN PATENT DOCUMENTS

| | | |
|---|---|---|
| CN | 109565459 A | 4/2019 |
| CN | 110912795 A | 3/2020 |
| CN | 113132142 A | 7/2021 |
| WO | 2017186092 A1 | 11/2017 |
| WO | 2020052230 A1 | 3/2020 |

OTHER PUBLICATIONS

European Patent Office. Extended European Search Report for EP Application No. 21884682.2, mailed Mar. 3, 2024, pp. 1-12.
The State Intellectual Property Office of People's Republic of China. First Office Action for CN Application No. 202011156816.5 and English translation, mailed Aug. 30, 2024, pp. 1-18.
The State Intellectual Property Office of People's Republic of China. First Search Report for CN Application No. 202011156816.5 and English translation, mailed Aug. 28, 2024, pp. 1-4.
International Searching Authority. International Search Report and Written Opinion for PCT Application No. PCT/CN2021/115947 and English translation, mailed Oct. 28, 2021, pp. 1-11.

* cited by examiner

Send a downlink slice service packet carrying a network slice identifier and a network slice parameter to a bearer network device, according to the processed uplink slice service packet, so that the bearer network device processes the downlink slice service packet according to the network slice identifier and the network slice parameter in the downlink slice service packet — S330

FIG. 18

Base station acquires slice service information from a terminal device — S410

Base station sends an uplink slice service packet carrying a network slice identifier and a network slice parameter to the bearer network device, according to the slice service information, where the network slice identifier and the network slice parameter are processable by the bearer network device — S420

Bearer network device forwards the uplink slice service packet to the core network device according to the network slice identifier and network slice parameter in the uplink slice service packet — S430

Core network device processes the uplink slice service packet according to the local slice service configuration policy, and the network slice identifier and the network slice parameters in the uplink slice service packet — S440

FIG. 19

INFORMATION PROCESSING METHOD, BASE STATION, BEARER NETWORK DEVICE, CORE NETWORK DEVICE, AND MEDIUM

CROSS-REFERENCE TO RELATED APPLICATION

This application is a national stage filing under 35 U.S.C. § 371 of international application number PCT/CN2021/115947, filed Sep. 1, 2021, which claims priority to Chinese patent application No. 202011156816.5, filed Oct. 26, 2020. The contents of these applications are incorporated herein by reference in their entirety.

TECHNICAL FIELD

The present disclosure relates to but is not limited to the technical field of communication, in particular to a method for information processing, a base station, a bearer network device, a core network device, and a computer-readable storage medium.

BACKGROUND

In different application scenarios of a new generation of mobile communication networks (such as 5G networks), there are huge differences in mobility, bandwidth, delay, reliability, security, operation charging, etc. Therefore, the 3rd generation partnership project (3GPP) defines the network slice to provide different service processing mechanisms for 5G services in different application scenarios through different virtual networks.

The end-to-end system of a typical new generation mobile communication network (such as 5G network) mainly involves multi-domain networks such as base station, bearer network and core network, and networks of each domain need to identify and individually process the network slices. A variety of technical schemes for identifying and individually processing the network slices have been proposed in the art. However, in these technical schemes, it is still necessary to achieve the collaborative scheduling of end-to-end system services between the base station and the bearer network, and between the bearer network and the core network through cross-main schedulers, so the overall scheme is relatively complicated and the collaborative deployment between networks of each domain is relatively inefficient.

SUMMARY

The following is a summary of the subject matter described herein. This summary is not intended to limit the scope of protection of the claims.

Provided are a method for information processing, a base station, a bearer network device, a core network device, and a computer-readable storage medium in some embodiments of the present disclosure.

According to an aspect of the present disclosure, an embodiment provides a method for information processing, which may include, acquiring slice service information from a terminal device; sending an uplink slice service packet carrying a network slice identifier and a network slice parameter to a bearer network device, according to the slice service information, so that the bearer network device processes the uplink slice service packet according to the network slice identifier and network slice parameter in the uplink slice service packet, where both the network slice identifier and network slice parameter are processable by the bearer network device.

According to another aspect of the present disclosure, an embodiment provides a method for information processing, which may include, acquiring a first slice service packet from a base station or a core network device, where the first slice service packet carries a network slice identifier and a network slice parameter, and both the network slice identifier and the network slice parameter are processable by a bearer network device; and processing the first slice service packet according to the network slice identifier and the network slice parameter in the first slice service packet.

According to yet another aspect of the present disclosure, an embodiment provides a method for information processing, which may include, acquiring an uplink slice service packet from a bearer network device, where the uplink slice service packet carries a network slice identifier and a network slice parameter, and both the network slice identifier and the network slice parameter are processable by a bearer network device; and processing the uplink slice service packet according to a local slice service configuration policy, and the network slice identifier and the network slice parameter in the uplink slice service packet.

According to yet another aspect of the present disclosure, an embodiment provides a method for information processing, which may include, acquiring, by a base station, slice service information from a terminal device; sending, by the base station, an uplink slice service packet carrying a network slice identifier and a network slice parameter, to a bearer network device according to the slice service information, where both the network slice identifier and the network slice parameter are processable by the bearer network device; forwarding, by the bearer network device, the uplink slice service packet to a core network device according to the network slice identifier and the network slice parameter in the uplink slice service packet; and processing, by the core network device, the uplink slice service packet according to a local slice service configuration policy, and the network slice identifier and the network slice parameter in the uplink slice service packet.

According to yet another embodiment of the present disclosure, an embodiment provides a base station, which may include a memory, a processor and a computer program stored in the memory and executable by the processor which, when executed by the processor causes the processor to carry out the corresponding method as described above.

According to yet another embodiment of the present disclosure, an embodiment provides a bearer network device, which may include a memory, a processor and a computer program stored in the memory and executable by the processor which, when executed by the processor causes the processor to carry out the corresponding method as described above.

According to yet another embodiment of the present disclosure, an embodiment provides a core network device, which may include a memory, a processor and a computer program stored in the memory and executable by the processor which, when executed by the processor causes the processor to carry out the corresponding method as described above.

According to yet another embodiment of the present disclosure, there is further provided a computer-readable storage medium storing a computer-executable instruction which, when executed by a processor causes the processor to carry out any one of the methods as described above.

Other features and advantages of the present disclosure will be illustrated in the following description, and in part will be apparent from the description, or may be understood by practicing the present application. The objects and other advantages of the present application can be achieved and acquired by the structure particularly set forth in the description, claims and drawings.

BRIEF DESCRIPTION OF DRAWINGS

The drawings are intended to provide a further understanding of the technical scheme of the present application, and constitute a part of the specification, and they are intended to illustrate the technical scheme of the present application in conjunction with the embodiments of the present application, but are not intended to limit the technical scheme of the present application.

FIG. 18 depicts a flowchart showing a method for information processing applied to a core network device according to another embodiment of the present disclosure;

FIG. 19 depicts a flowchart showing a method for information processing applied to a network system according to an embodiment of the present disclosure;

DETAILED DESCRIPTION

The purpose, technical scheme and advantages of the present application will become apparent through the following description for various embodiments in conjunction with the drawings. It should be understood that the embodiments described here are intended for illustration but not limitation of the present application.

It should be noted that although the devices are shown with individual functional modules in the schematic diagram and the logical sequences are shown in the flow chart, in some cases, the devices can have different modules than those shown and the steps can be executed in a different order than those shown. It should be noted that the terms "first" and "second", if used in the description, the claims and the drawings are intended to distinguish similar objects, and do not necessarily imply any specific order or sequence.

The present disclosure provides a method for information processing, a base station, a bearer network device, a core network device and a computer-readable storage medium. When the base station acquires slice service information from a terminal device, the base station may send an uplink slice service packet carrying a network slice identifier and a network slice parameter to the bearer network device according to the slice service information, so that the bearer network device can process the uplink slice service packet according to the network slice identifier and the network slice parameter in the uplink slice service packet, where both the network slice identifier and the network slice parameter are processable by the bearer network device. By means of the uplink slice service packet carrying the network slice identifier and the network slice parameter that are processable by the bearer network device, when the bearer network device receives the uplink slice service packet, the bearer network device can identify and individually process the uplink slice service packet on the forwarding plane according to the network slice identifier and the network slice parameter in the uplink slice service packet. And it is not necessary to achieve the cooperative processing of the uplink slice service packet through a complex cross-domain scheduler, thereby reducing the complexity of the network slice scheduling system.

Some embodiments of the present application will be further illustrated with reference to the drawings.

Figure 1:
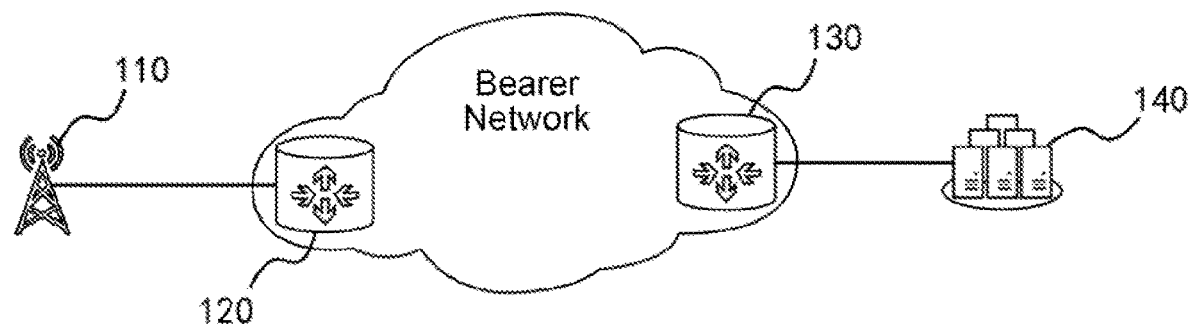
FIG. 1 depicts a schematic diagram showing a network topology in which a method for information processing according to an embodiment of the present disclosure is performed.

Referring to FIG. 1, which depicts a schematic diagram showing a network topology in which a method for information processing according to an embodiment of the present disclosure is performed. In the embodiment shown in FIG. 1, the network topology includes a base station 110, a first bearer network device 120, a second bearer network device 130 and a core network device 140 which are connected in sequence. The first bearer network device 120 and the second bearer network device 130 are arranged within the bearer network. The first bearer network device 120 is an edge node connected with the base station 110 and the second bearer network device 130 is an edge node connected with the core network device 140.

The transmission direction at which the service packet successively passes through the base station 110, the first bearer network device 120, the second bearer network device 130 and the core network device 140 is the uplink transmission direction. In such a case, the service packet is an uplink service packet. The transmission direction at which the service packet successively passes through the core network device 140, the second bearer network device 130, the first bearer network device 120 and the base station 110 is the downlink transmission direction. In such a case, the service packet is a downlink service packet.

Upon receiving a network connection request based on a network slice from a user terminal, the base station 110 may construct a corresponding uplink slice service packet according to the network connection request and send the uplink slice service packet to the core network device 140 through the first bearer network device 120 and the second bearer network device 130 successively. In such a case, the core network device 140 may perform related processing on the uplink slice service packet, and construct a corresponding downlink slice service packet according to the uplink slice service packet. The core network device 140 then sends the downlink slice service packet to the base station 110 through the second bearer network device 130 and the first bearer network device 120 successively. Thereby, the base station 110 processes the downlink slice service packet, and forwards the processed downlink slice service packet to the user terminal. As such, the network access of the user terminal is achieved based on network slice.

In addition, each of the base station 110, the first bearer network device 120, the second bearer network device 130 and the core network device 140 is provided with a processor and a memory storing an information processing program that is executable by the processor. The processor and the memory can be connected by bus or other means.

As a non-transitory computer-readable storage medium, the memory can be configured to store non-transitory software programs and non-transitory computer-executable programs. In addition, the memory may include high-speed random-access memory and non-transitory memory, such as at least one disk memory device, flash memory device, or other non-transitory solid-state memory devices. In some embodiments, the memory may include memories remotely located with respect to the processor, and these remote memories may be connected to the processor through a network. Examples of the above networks include, but are not limited to, the Internet, intranet, local area network, mobile communication network, and combinations thereof.

The network topology and application scenarios described in an embodiment of this application are intended for better understanding of rather than limitations to the technical scheme of various embodiments of the present disclosure. It is known to those having ordinary skills in the art that, with the evolution of the network topology and the emergence of new application scenarios, the technical scheme provided by the embodiment of the present disclosure is also applicable to similar technical problems.

It can be understood by those having ordinary skills in the art that the topology shown in FIG. 1 does not constitute a limitation to the embodiment of the present application, and may include more or less components than those shown, or some components may be combined, or have different component arrangements.

In the network topology shown in FIG. 1, each device can call the stored information processing program thereon to carry out the method for information processing.

Several embodiments of the method for information processing are provided based on the above network topology in the present disclosure.

Figure 2:
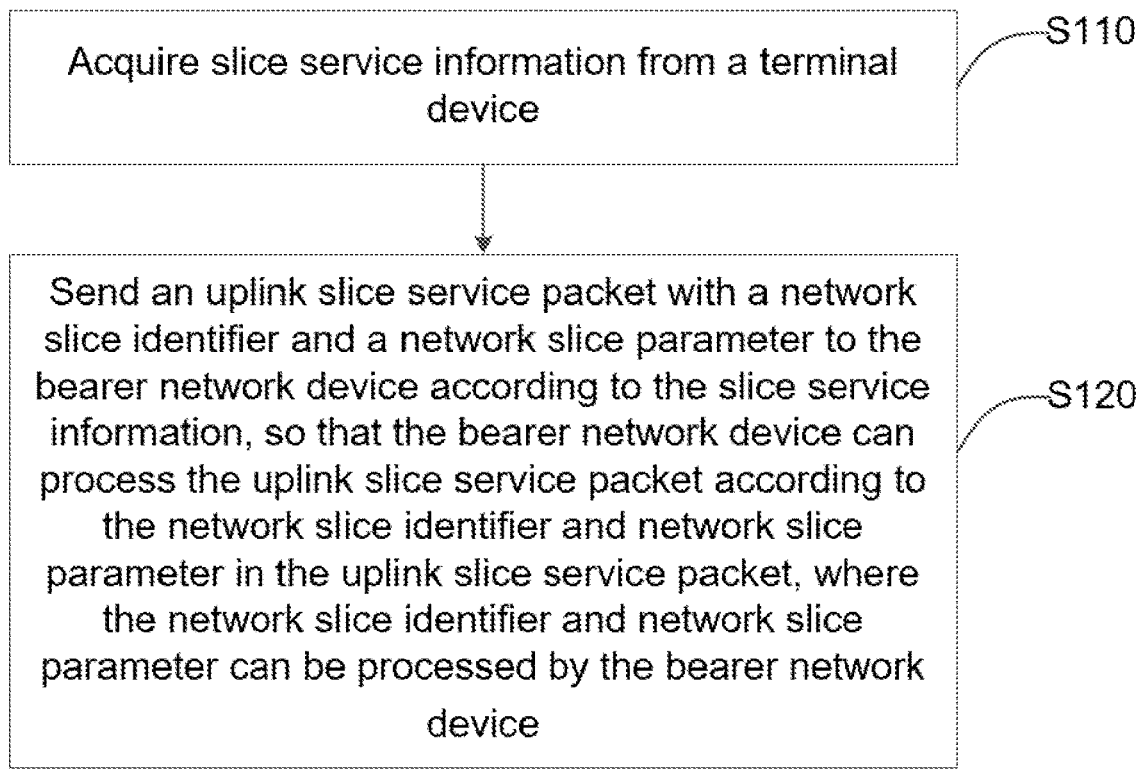
FIG. 2 depicts a flowchart showing a method for information processing applied to a base station according to an embodiment of the present disclosure.

Referring to FIG. 2, which depicts a flowchart showing a method for information processing according to an embodiment of the present application. The method is applied to a base station, such as the base station 110 in the embodiment shown in FIG. 1, and includes but is not limited to operations S110 and S120.

At S110, slice service information is acquired from a terminal device.

In an embodiment, the slice service information may include network slice selection information, and may also include a terminal device identifier or an application identifier corresponding to a subscribed network slice. The embodiment is not limited thereto. When the terminal device initiates a network connection request, the base station can acquire the slice service information from the related request message sent by the terminal device. For example, regarding a terminal device that did not subscribe to a dedicated network slice, when the terminal device initiates a connection request for a network slice, the terminal device may send network slice selection information indicating the desired network slice for connection to the base station. The network slice selection information received by the base station is the slice service information from the terminal device. In such a case, the base station may connect the corresponding network slice for the terminal device according to the network slice selection information. For another example, regarding a terminal device that has subscribed a dedicated network slice, when initiating the connection request for the subscribed network slice, the terminal device may only send the terminal identifier, or the terminal identifier and the application identifier of the application subscribed with the network slice to the base station. The terminal identifier or the information including the terminal identifier and the application identifier received by the base station is the slice service information from the terminal device. In such a case, the base station may search for and connect the network slice corresponding to the terminal device according to the terminal identifier or the terminal identifier and the application identifier.

At S120, an uplink slice service packet with a network slice identifier and a network slice parameter is sent to the bearer network device according to the slice service information, so that the bearer network device can process the uplink slice service packet according to the network slice identifier and network slice parameter in the uplink slice service packet, where the network slice identifier and network slice parameter can be processed by the bearer network device.

In an embodiment, after acquiring the slice service information from the terminal device, the base station first acquires the network slice identifier and the network slice parameter corresponding to the slice service information according to the slice service information. Then the base station constructs an uplink slice service packet carrying the network slice identifier and the network slice parameter, where the network slice identifier and the network slice parameter can be processed by the bearer network device. The base station, then sends the uplink slice service packet to the bearer network device, so that the bearer network device can parse the network slice identifier and the network slice parameter from the uplink slice service packet, so that the uplink slice service packet can be identified and processed individually according to the network slice identifier and the network slice parameter.

In an embodiment, the acquisition of the network slice identifier and the network slice parameter corresponding to the slice service information by the base station, according to the slice service information, can be performed in various manners, and this embodiment does not specifically limit this. For example, the base station pre-stores network slice identifiers and network slice parameters of various network slices. When the base station acquires slice service information from the terminal device, the base station looks for the network slice identifiers and network slice parameters corresponding to the terminal device from the pre-stored network slice identifiers and network slice parameters according to the slice service information. For another example, after acquiring the slice service information from the terminal device, the base station can initiate an acquisition request for the network slice identifier and the network slice parameter corresponding to the slice service information to the core network device according to the slice service information, so as to acquire the network slice identifier and the network slice parameter corresponding to the slice service information from the core network device. For yet another example, after acquiring the slice service information from the terminal device, the base station can send instruction information for acquiring the network slice identifier and the network slice parameters to the terminal device according to the slice service information, so as to acquire the network slice identifier and the network slice parameters corresponding to the slice service information from the terminal device.

In an embodiment, the network slice identifier can be single network slice selection assistance information (S-NSSAI). The network slice parameters include, but are not limited to, at least one of, slice isolation type parameters, slice quality requirement parameters and slice Service-Level Agreement (SLA) requirement parameters. And the network slice parameters can be appropriately selected according to the actual usage of the terminal device, which are not specifically limited in this embodiment.

In an embodiment, a packet substructure which can be processed by the bearer network device can be newly set in the uplink slice service packet. The packet substructure carries the network slice identifier and the network slice parameters, so that when the bearer network device receives the uplink slice service packet including the packet substructure, the bearer network device can parse and acquire the network slice identifier and the network slice parameters from the packet substructure. In this way, the uplink slice service packet can be identified and distinguished according to the network slice identifier and the network slice parameters.

In an embodiment, the packet substructure may include a slice identifier field and a slice parameter field, where the network slice identifier is set in the slice identifier field and the network slice parameter is set in the slice parameter field. In addition, the slice parameter field can include multiple parameter subfields, which can be appropriately extended according to the actual situation.

The packet substructure will be illustrated by way of examples in the following.

Figure 3:
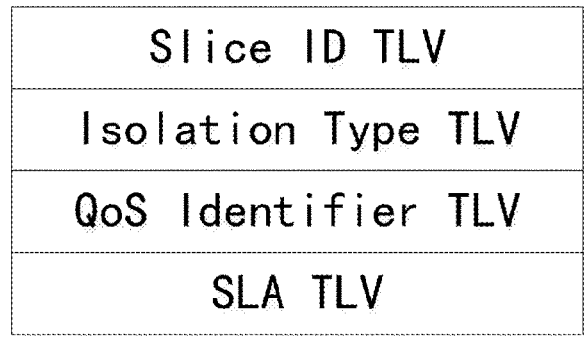
FIG. 3 depicts a schematic diagram showing a packet substructure according to an embodiment of the present disclosure.

Referring to FIG. 3, which depicts a schematic diagram showing the packet substructure. In FIG. 3, the packet substructure includes a Slice ID TLV structure, an Isolation Type TLV structure, a QoS Identifier TLV structure and an SLA TLV structure, where the Slice ID TLV structure is the slice identifier field, and the combination of Isolation Type TLV structure, QoS Identifier TLV structure, and SLA TLV structure is the slice parameter field.

Figure 4:
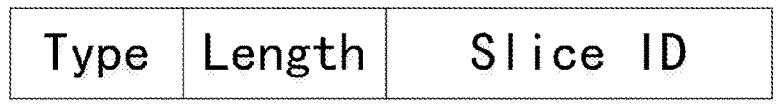
FIG. 4 depicts a schematic diagram showing the Slice ID TLV structure in the packet substructure according to another embodiment of the present disclosure.

As shown in FIG. 4, the Slice ID TLV structure includes attribute fields which are indicative of the network slice identifiers. The meanings of the fields in this Slice ID TLV structure are as follows.

Type: This indicates that this TLV structure is a TLV structure that includes a field indicating the network slice identifier.

Length: This indicates the length of this TLV structure.

Slice ID: This is indicative of the network slice identifier. This field uniquely identifies a slice service, with e.g., S-NSSAI.

Figure 5:
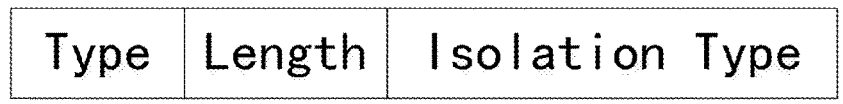
FIG. 5 depicts a schematic diagram showing an Isolation Type TLV structure in a packet substructure according to another embodiment of the present disclosure.

As shown in FIG. 5, the Isolation Type TLV structure includes attribute fields indicating slice isolation type parameters. The meanings of the fields in this Isolation Type TLV structure are as follows.

Type: This indicates that this TLV structure is a TLV structure that includes a field indicating the slice isolation type parameter.

Length: This indicates the length of this TLV structure.

Isolation Type: a parameter indicating the slice isolation type, and the value of this field can be one of the following: end-to-end hard isolation, hop-by-hop hard isolation, tunnel layer soft isolation, Virtual Private Network (VPN) isolation combined with tunnel sharing, VPN sharing, etc.

Figure 6:
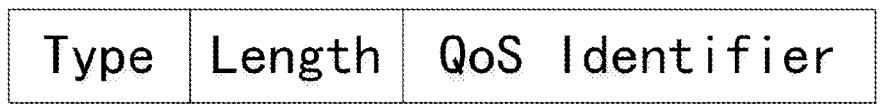
FIG. 6 depicts a schematic diagram showing a QoS Identifier TLV structure in a packet substructure according to another embodiment of the present disclosure.

As shown in FIG. 6, the QoS Identifier TLV structure includes attribute fields indicating the slice quality requirements. The meanings of the fields in this QoS Identifier TLV structure are as follows.

Type: This indicates that this TLV structure is a TLV structure that includes a field indicating slice quality requirements.

Length: This indicates the length of this TLV structure.

QoS Identifier: a parameter that is indicative of the slice quality requirements, with e.g., a 5G QoS Class Identifier (5QI) defined by the 3GPP standard.

Figure 7:
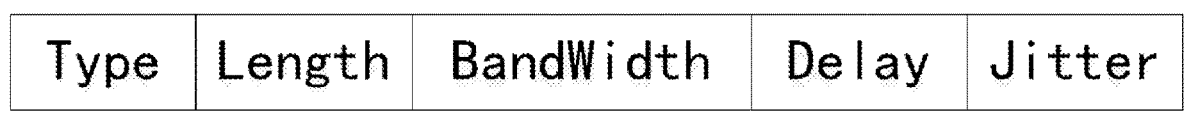
FIG. 7 depicts a schematic diagram showing an SLA TLV structure in a packet substructure according to another embodiment of the present disclosure.

As shown in FIG. 7, the SLA TLV structure includes attribute fields that indicate the SLA requirements parameters of the slice. The meanings of the fields in this SLA TLV structure are as follows.

Type: This indicates that this TLV structure is a TLV structure that includes a field indicating the slice SLA requirements.

Length: This indicates the length of this TLV structure.

BandWidth: which indicates the bandwidth requirement of the slice service.

Delay: indicates the delay requirement of the slice service.

Jitter: indicates the jitter requirement of the slice service.

It can be understood by those having ordinary skills in the art that the bearer network device can generally only process up to the L3 encapsulation structure of the packet, so the packet substructure carrying the network slice identifier and the network slice parameters can be set in the L2 encapsulation structure or L3 encapsulation structure of the slice service packet. It is worth noting that in some specific cases, the packet substructure can also be set in the Transmission Control Protocol (TCP) header or the User Datagram Protocol (UDP) header. This embodiment does not limit this specifically, as long as the packet substructure is set in a position in the slice service packet that can be easily identified by wireless access devices, bearer network devices and core network devices.

The position where the packet substructure is set in the slice service packet, will be illustrated by way of examples in the following.

Figure 8:
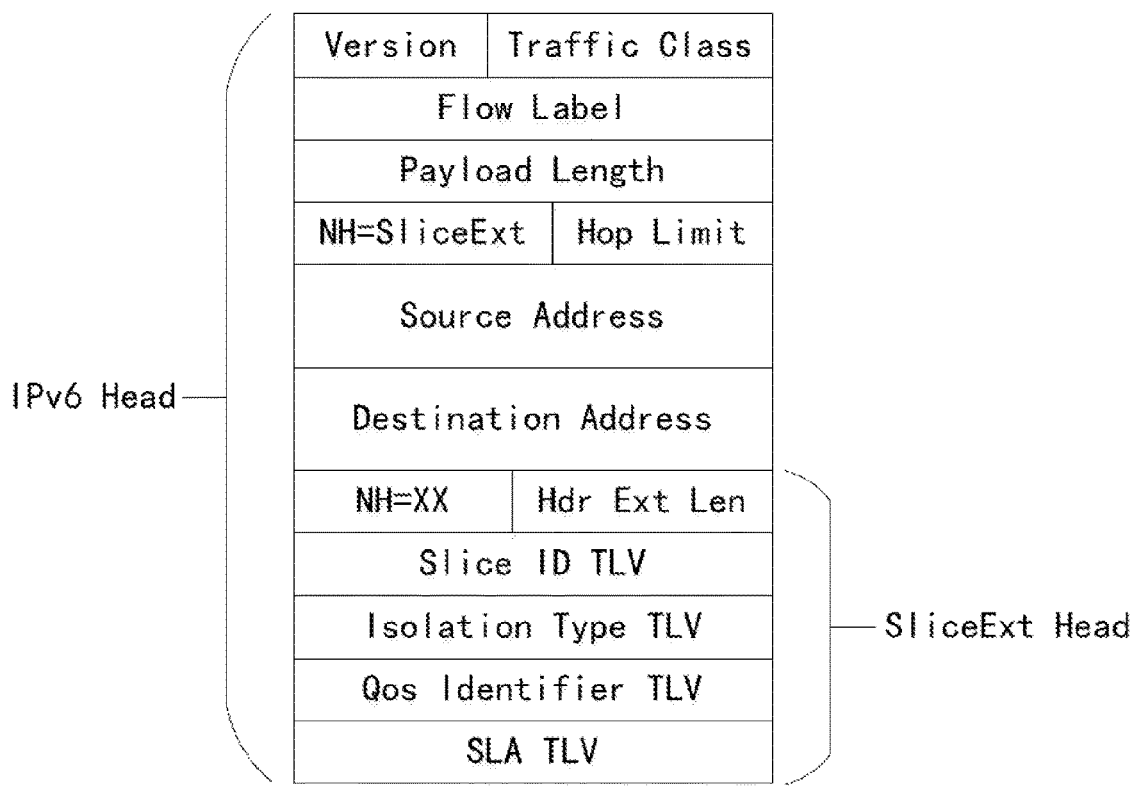
FIG. 8 depicts a schematic diagram showing the position where a packet substructure is set in a slice service packet according to an embodiment of the present disclosure.

Referring to FIG. 8, in another embodiment, the packet substructure is set in an extension header of the IPv6 packet header (the SliceExt Head as shown in FIG. 8). In such a case, content (e.g., NH=SliceExt) indicating that the next hop is SliceExt Head is written into the field "NH" (i.e., the next hop field) in the IPv6 header. In particular, the field "Hdr Ext Len" in the extension header (such as SliceExt Head) indicates the length of the SliceExt Head. It is worth noting that the meanings of other fields in the IPv6 header are the same as those of the corresponding fields in the existing IPv6 header, so they are not repeated here. Because the bearer network device can parse the information in the IPv6 header, the bearer network device can identify the information carried in the packet substructure set in the extension header of the IPv6 header. And therefore, the bearer network device can identify and individually process the slice service packet on the forwarding plane according to the network slice identifier and network slice parameters in the packet substructure.

Figure 9:
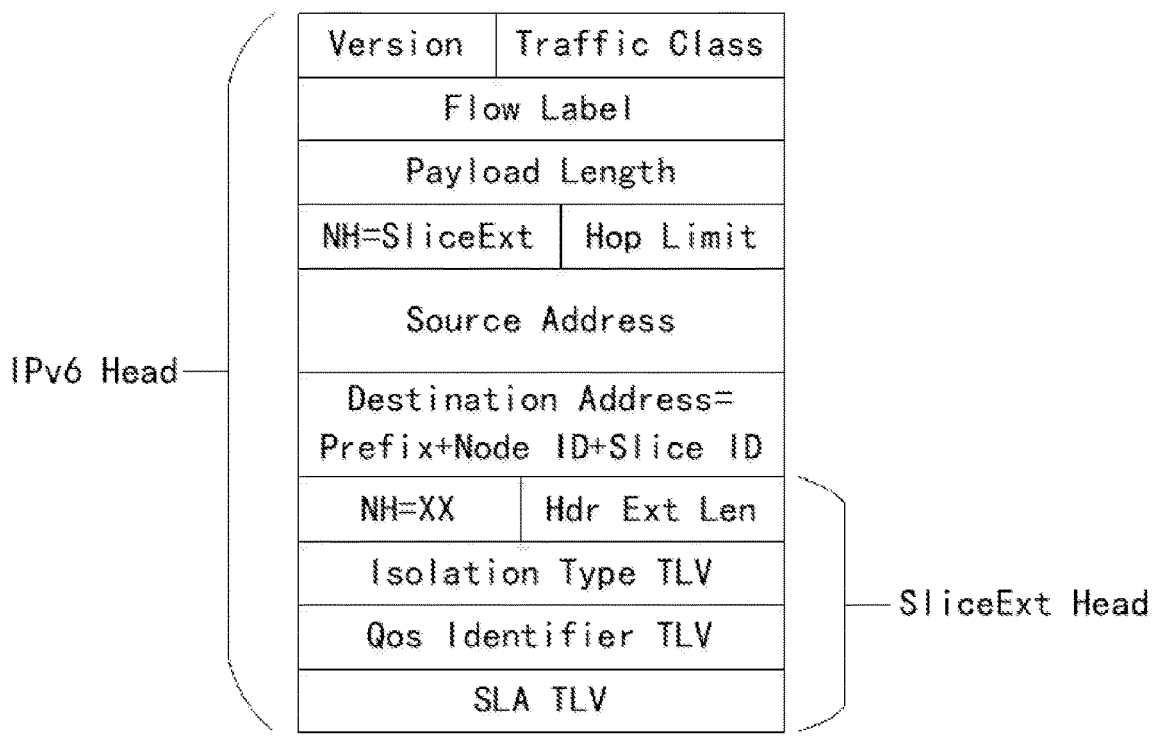
FIG. 9 depicts a schematic diagram showing the position where a packet substructure is set in a slice service packet according to another embodiment of the present disclosure.

As shown in FIG. 9, in an embodiment, the slice identifier field in the packet substructure can be set in the destination address field of the IPv6 header, while the slice parameter fields in the packet substructure (including the Isolation Type TLV structure, the QoS Identifier TLV structure and the SLA TLV structure) can be set in an extension header of the IPv6 header (SliceExt Head as shown in FIG. 9). In such a case, the contents written in the destination address field (i.e., the filed "Destination Address") in the IPv6 header, include address prefix (Prefix), node identifier (Node ID) and network slice identifier (Slice ID). Written in the field "NH" (i.e., the next hop field) in the IPv6 header, is the content indicating that the next hop is SliceExt Head (e.g., NH=SliceExt). In particular, the field "Hdr Ext Len" in the extension header (such as SliceExt Head) indicates the length of the SliceExt Head. It is worth noting that the meanings of other fields in the IPv6 header are the same as those of the corresponding fields in the existing IPv6 header, so they are not repeated here. Because the bearer network device can parse the information in the IPv6 header, the bearer network device can identify the information carried in the packet substructure set in the IPv6 header. And therefore, the bearer network device can identify and individually process the slice service packet on the forwarding plane according to the network slice identifier and network slice parameters in the packet substructure.

Figure 10:
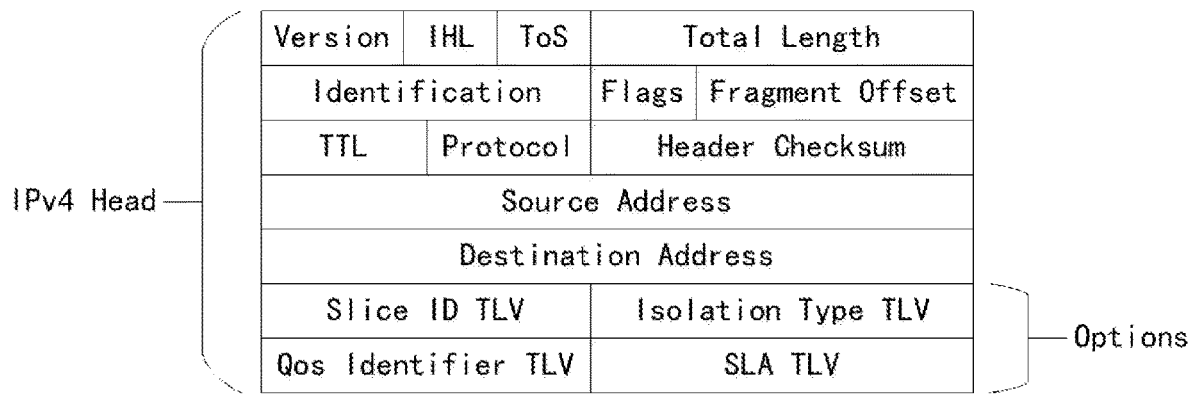
FIG. 10 depicts a schematic diagram showing the position where a packet substructure is set in a slice service packet according to another embodiment of the present disclosure.

As shown in FIG. 10, in an embodiment, the packet substructure is set in the option field of the IPv4 header ("Options", as shown in FIG. 10). It is worth noting that the meanings of other fields in the IPv4 header are the same as those of the corresponding fields in the existing IPv4 header, so they are not repeated here. Because the bearer network device can parse the information in the IPv4 header, the bearer network device can identify the information carried in the packet substructure set in the option field of the IPv4 header. And therefore, the bearer network device can identify and individually process the slice service packet on the forwarding plane according to the network slice identifier and network slice parameters in the packet substructure.

Figure 11:
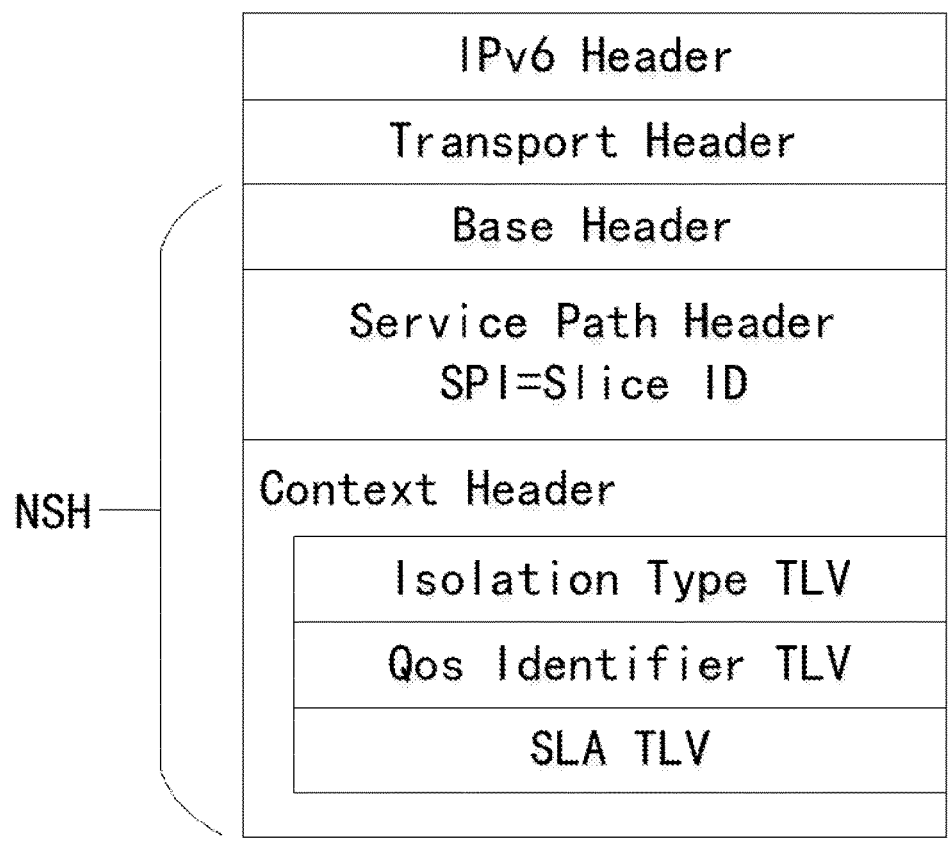
FIG. 11 depicts a schematic diagram showing the position where a packet substructure is set in a slice service packet according to another embodiment of the present disclosure.

As shown in FIG. 11, in another embodiment, the packet substructure is set in the Network Service Header (NSH). In such a case, the slice identifier field in the packet substructure can be set in the field "Service Path ID" (SPI) field in the NSH, while the slice parameter fields in the packet substructure (including the Isolation Type TLV structure, the QoS Identifier TLV structure and the SLA TLV structure) can be set in the field "Context Header" in the NSH. It is worth noting that the meanings of other fields in the NSH are the same as those of the corresponding fields in the existing NSH, so they are not repeated here. Because the bearer network device can parse the information in the NSH, the bearer network device can identify the information carried in the packet substructure set in the NSH. And therefore, the bearer network device can identify and individually process the slice service packet on the forwarding plane according to the network slice identifier and network slice parameters in the packet substructure.

Figure 12:
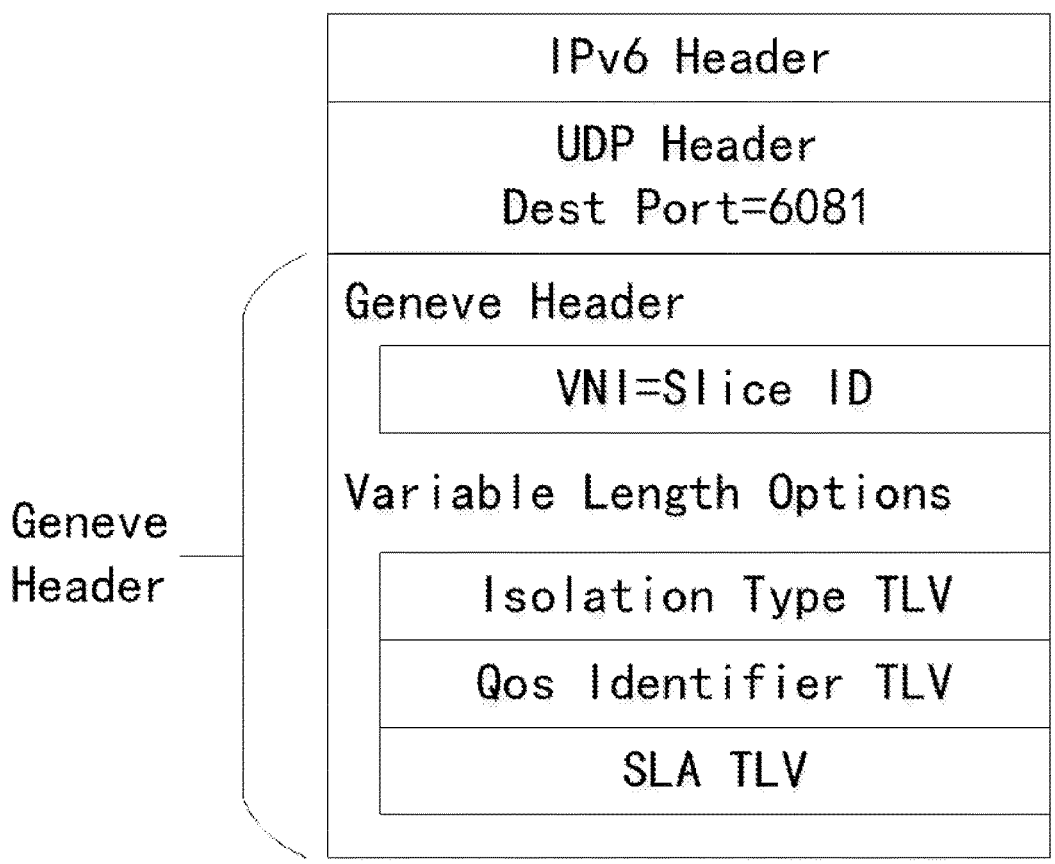
FIG. 12 depicts a schematic diagram showing the position where a packet substructure is set in a slice service packet according to another embodiment of the present disclosure.

As shown in FIG. 12, in an embodiment, the packet substructure is set in the Generic Network Virtualization Encapsulation (GENEVE). In such a case, the slice identifier field in the packet substructure can be set in the Virtual Network Identifier (VNI) field in the Geneve header, while the slice parameter fields (including the Isolation Type TLV structure, the QoS Identifier TLV structure and the SLA TLV structure) in the packet substructure can be set in the variable length options field in the Geneve header ("Variable Length Options" as shown in FIG. 12). Because the bearer network device can parse the information in the Geneve header, the bearer network device can identify the information carried in the packet substructure set in the Geneve header. And therefore, the bearer network device can identify and individually process the slice service packet on the forwarding plane according to the network slice identifier and network slice parameters in the packet substructure.

In an embodiment, by means of the method for information processing including the above S110 and S120, when acquiring the slice service information from the terminal device, the base station can send an uplink slice service packet carrying the network slice identifier and the network slice parameters to the bearer network device according to the slice service information. And thus, the bearer network device can process the uplink slice service packet according to the network slice identifier and the network slice parameters in the uplink slice service packet, where the network slice identifier and the network slice parameters are processable by the bearer network device. By means of the uplink slice service packet carrying the network slice identifier and the network slice parameter that are processable by the bearer network device, when the bearer network device receives the uplink slice service packet, the bearer network device can identify and individually process the uplink slice service packet on the forwarding plane according to the network slice identifier and the network slice parameter in the uplink slice service packet. And it is not necessary to achieve the cooperative processing of the uplink slice service packet through a complex cross-domain scheduler, thereby reducing the complexity of the network slice scheduling system.

Figure 13:
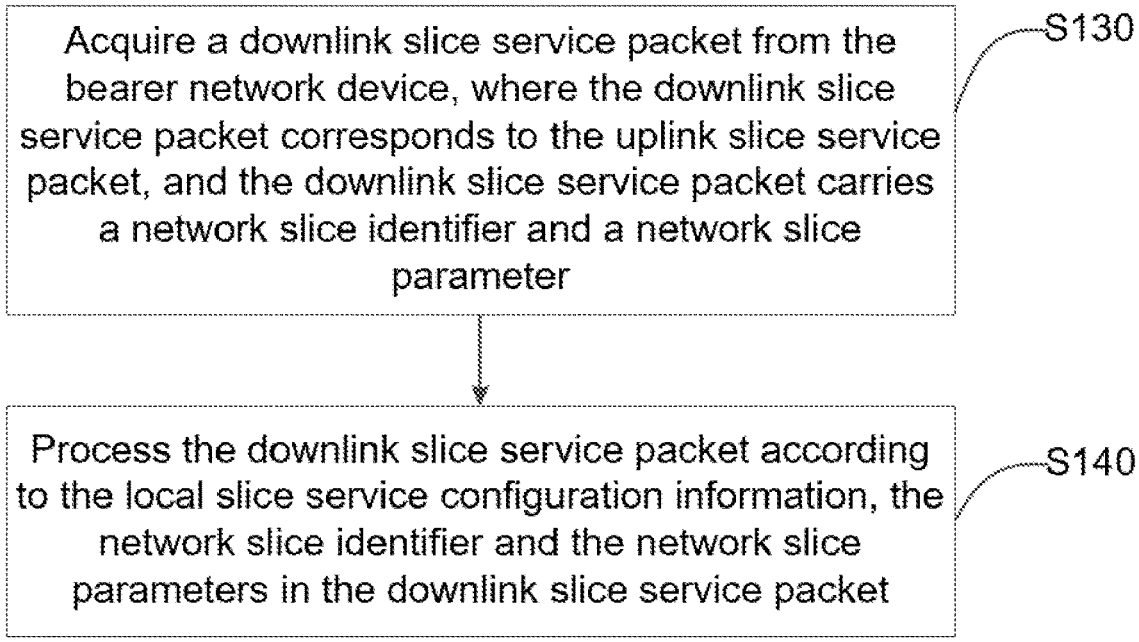
FIG. 13 depicts a flowchart showing a method for information processing applied to a base station according to another embodiment of the present disclosure.

Referring to FIG. 13, in an embodiment, the method for information processing may further include, but is not limited to, the following operations.

At S130, a downlink slice service packet is acquired from the bearer network device, where the downlink slice service packet corresponds to the uplink slice service packet, and the downlink slice service packet carries a network slice identifier and a network slice parameter.

At S140, the downlink slice service packet is processed according to the local slice service configuration information, the network slice identifier and the network slice parameters in the downlink slice service packet.

In an embodiment, after S120 is performed, when the base station receives a downlink slice service packet that carries a network slice identifier and a network slice parameter from a bearer network device, the base station performs related processing on the downlink slice service packet according to preset local slice service configuration information, the network slice identifier and the network slice parameter in the downlink slice service packet. As such, the processing priority of the downlink slice service packet is increased and the downlink slice service packet is forwarded to the terminal device, thereby completing the network access of the terminal device based on the network slice.

It is worth noting that the downlink slice service packet from the bearer network device in this embodiment corresponds to the uplink slice service packet sent by the base station to the bearer network device in the embodiment shown in FIG. 2. The downlink slice service packet in this embodiment is generated by the core network device according to the uplink slice service packet. Similarly, the downlink slice service packet also includes a packet substructure which has the same structural format and the same meanings for the fields as those in the uplink slice service packet. Regarding the structural format and meanings of the fields in the packet substructure in the downlink slice service packet, please refer to the relevant descriptions in the embodiments shown in FIGS. 3, 4, 5, 6 and 7, and which are not repeated here. In addition, the position where the packet substructure is set in the downlink slice service packet, is the same as the position where the packet substructure is set in the uplink slice service packet. Regarding the position where the packet substructure is set in the downlink slice service packet, please refer to the relevant descriptions in the embodiments shown in FIGS. 8, 9, 10, 11, and 12, which are not repeated here.

It should be noted that the network slice identifier and network slice parameters carried by the packet substructure in the downlink slice service packet in this embodiment are consistent with those carried by the packet substructure of the uplink slice service packet in the embodiment shown in FIG. 2.

Figure 14:
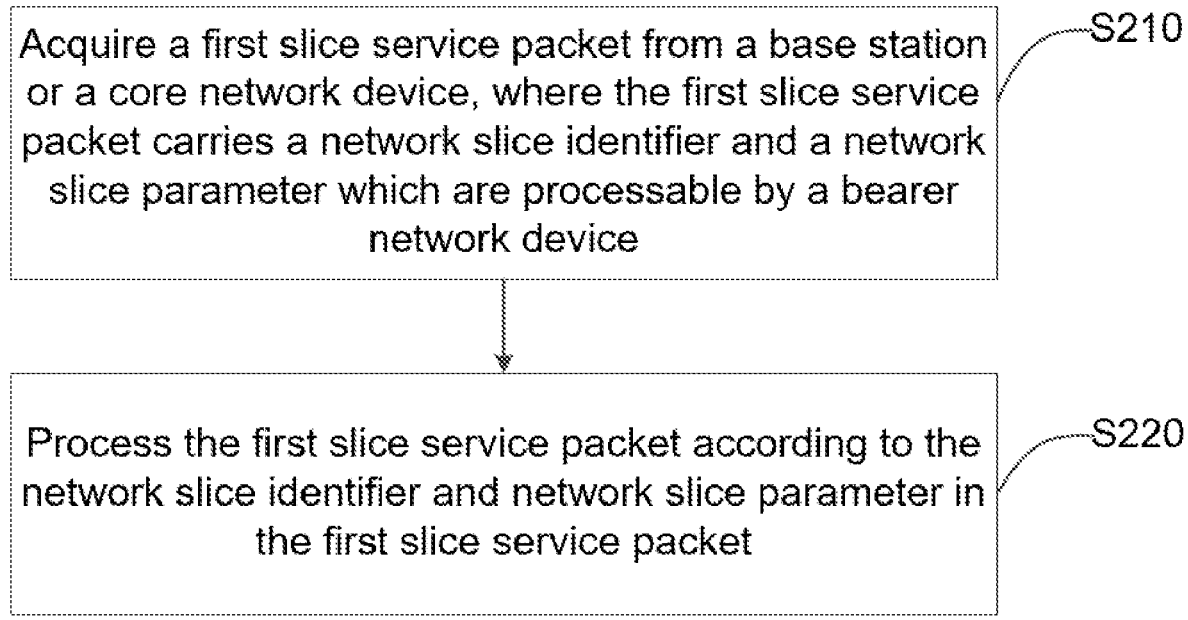
FIG. 14 depicts a flowchart showing a method for information processing applied to the bearer network device according to an embodiment of the present disclosure.

In addition, as shown in FIG. 14, which depicts a flowchart showing a method for information processing according to another embodiment of the present disclosure. The method is applied to a bearer network device, such as the first bearer network device 120 or the second bearer network device 130 in the embodiment shown in FIG. 1. The method includes but is not limited to the following operations.

At S210, a first slice service packet is acquired from a base station or a core network device, where the first slice service packet carries a network slice identifier and a network slice parameter which are processable by a bearer network device.

At S220, the first slice service packet is processed according to the network slice identifier and network slice parameter in the first slice service packet.

In an embodiment, after acquiring the first slice service packet from the base station or the core network device, the bearer network device may process the first slice service packet according to the network slice identifier and network slice parameter in the first slice service packet. And at this time, the bearer network device can determine whether a network slice service corresponding to the network slice identifier exists in the bearer network according to the network slice identifier. In case the corresponding network slice service exists, the bearer network device may directly process the first slice service packet according to the configuration information corresponding to the existing network slice service. For example, the bearer network device may encapsulate the first slice service packet with an additional tag suitable for transmission on the bearer network and forward the first slice service packet. In case the corresponding network slice service does not exist, the bearer network device may request a forwarding policy corresponding to the network slice identifier from a network controller, and then perform related encapsulation and forwarding processing on the first slice service packet according to the forwarding policy sent by the network controller.

It should be noted that the first slice service packet may be an uplink slice service packet from the base station or a downlink slice service packet from the core network device. And this embodiment does not specifically limit this.

In an embodiment, the network slice identifier may be S-NSSAI. The network slice parameters include, but are not limited to at least one of, slice isolation type parameters, slice quality requirement parameters, or slice SLA requirement parameters. And the network slice parameters can be appropriately selected according to the actual usage of the terminal device. And this embodiment does not specifically limit this.

In an embodiment, a packet substructure which can be processed by the bearer network device can be newly set in the first slice service packet. The packet substructure carries the network slice identifier and the network slice parameters, so that when the bearer network device receives the first slice service packet including the packet substructure, the bearer network device can parse and acquire the network slice identifier and the network slice parameters from the packet substructure. In this way, the first slice service packet can be identified and individually processed according to the network slice identifier and the network slice parameters.

In an embodiment, the packet substructure may include a slice identifier field and a slice parameter field, where the network slice identifier is set in the slice identifier field and the network slice parameter is set in the slice parameter field. In addition, the slice parameter field can include multiple parameter subfields, which can be appropriately extended according to the actual situation.

It is worth noting that the packet substructure in the first slice service packet in this embodiment has the same structure format and the same meanings for the fields as that in the above-described embodiments as shown in FIGS. 3, 4, 5, 6, and 7. Regarding the structure format and meanings for fields of the packet substructure in the first slice service packet in this embodiment, please refer to the relevant descriptions in the embodiments as shown in FIGS. 3, 4, 5, 6, and 7, and which are not repeated here. In addition, the position where the packet substructure is set in the first slice service packet in this embodiment, is the same as the position where the packet substructure is set in the uplink slice service packet as described in the embodiments as shown in FIGS. 8, 9, 10, 11, and 12. Regarding the position where the packet substructure is set in the first slice service packet in this embodiment, please refer to the relevant descriptions in the embodiments shown in FIGS. 8, 9, 10, 11, and 12, which are not repeated here.

In an embodiment, by means of the method for information processing including the above S210 and S220, when receiving the first slice service packet carrying the network slice identifier and the network slice parameters processable by the bearer network device, the bearer network device can identify and individually process the first slice service packet on the forwarding plane according to the network slice identifier and the network slice parameters in the first slice service packet. And it is not necessary to achieve cooperative processing of the first slice service packet through a complex cross-domain scheduler, thus reducing the complexity of the network slice scheduling system.

Figure 15:
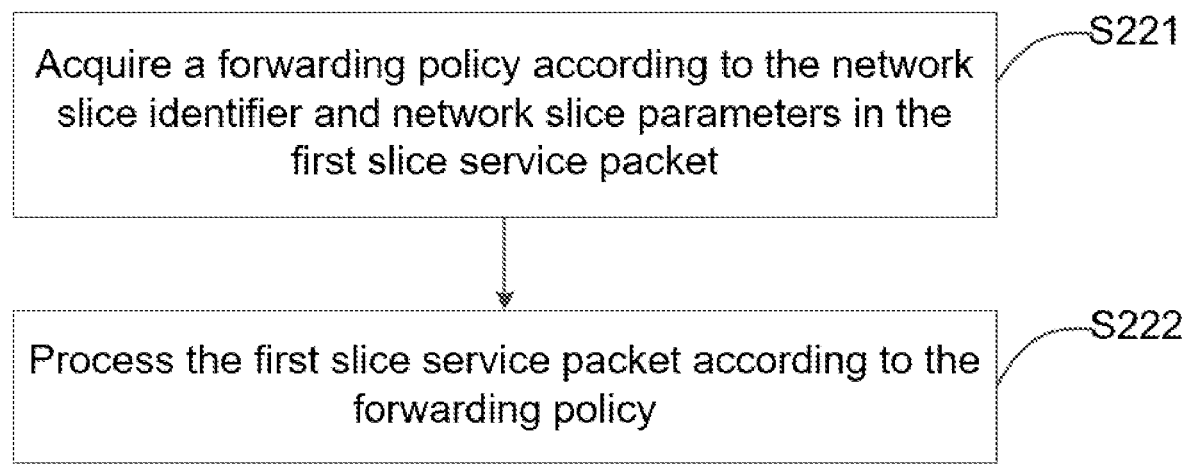
FIG. 15 depicts a flowchart showing processing on the first slice service packet in the method for information processing applied to a bearer network device according to another embodiment of the present disclosure.

In addition, referring to FIG. 15, in an embodiment, S220 may include but is not limited to the following operations.

At S221, a forwarding policy is acquired according to the network slice identifier and network slice parameters in the first slice service packet.

At S222, the first slice service packet is processed according to the forwarding policy.

In an embodiment, after receiving the first slice service packet carrying the network slice identifier and the network slice parameter, the bearer network device may first acquire the corresponding forwarding policy according to the network slice identifier and the network slice parameter, and then perform related encapsulation and forwarding processing on the first slice service packet according to the forwarding policy.

In an embodiment, the acquisition of the forwarding policy by the bearer network device according to the network slice identifier and the network slice parameter, can be performed in different ways. For example, the forwarding policy can be acquired according to the network slice identifier, the network slice parameter and the locally stored network topology information. Alternatively, the corresponding forwarding policy can be requested from the network controller according to the network slice identifier and the network slice parameter. And this embodiment does not specifically limit this.

The following provides an illustration by way of an example, for the implementation of the acquisition of the forwarding policy by the bearer network device according to the network slice identifier and the network slice parameters.

In case that the bearer network device is provided in a distributed system, the bearer network device can perform the path calculation of the Segment Routing (SR) tunnel according to the network slice parameters (e.g., the slice SLA requirement parameters), and based on the network slice identifier and the network slice topology information collected in advance through the Interior Gateway Protocol (IGP). Stream directing mode for the slice service packet is automatically configured according to the calculation results, so as to generate the forwarding policy. And after acquiring the forwarding policy, the bearer network device can also exchange routing configuration information with the remote network element through the Border Gateway Protocol (BGP).

In case that the bearer network device is provided in a centralized control system, the bearer network device can first send the network slice identifier and the network slice parameter to the network controller to request for the corresponding forwarding policy. After receiving the network slice identifier and the network slice parameter, the network controller can perform path calculation of the SR tunnel according to the network slice parameters (e.g., the slice SLA requirements) and based on the network slice identifier and the network slice topology information acquired in advance according to the information reported by each bearer network device, and then configures the stream directing mode for the slice service packet according to the calculation results, so as to generate the forwarding policy. Then, the network controller sends the forwarding policy to the bearer network device, such that, the bearer network device can acquire the forwarding policy corresponding to the network slice identifier and the network slice parameters.

In an embodiment, the processing on the first slice service packet by the bearer network device according to the forwarding policy, can be some additional encapsulation processing on the first slice service packet according to the forwarding policy. For example, additional virtual private network routing and forwarding instance (VRF) labels, and additional segment routing multi-protocol label switching (SR-MPLS) labels, or the like can be appended. And this embodiment does not specifically limit this.

Figure 16:
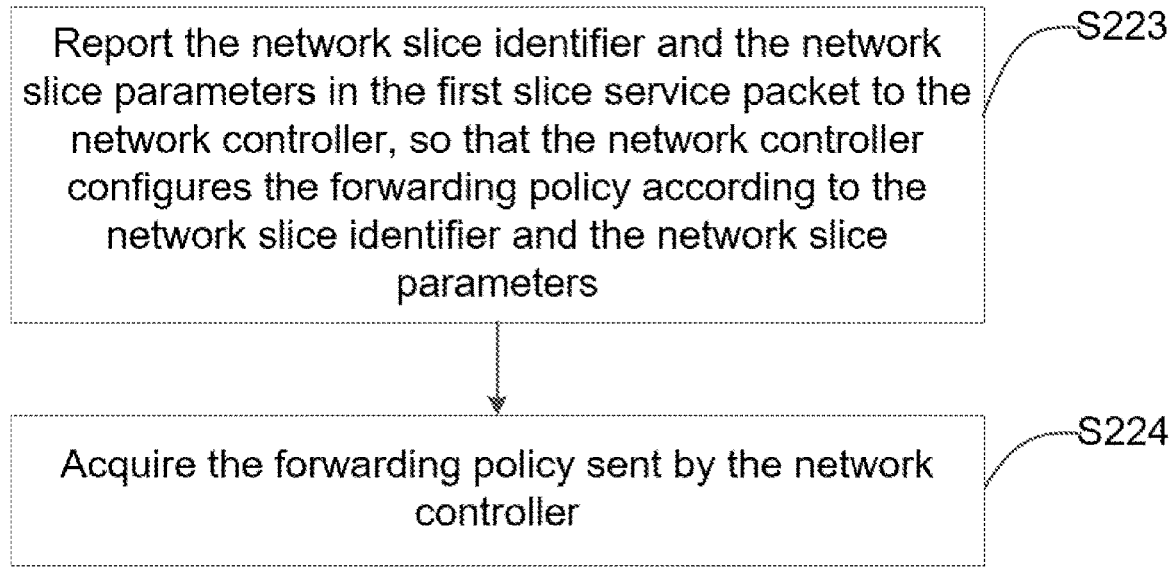
FIG. 16 depicts a flowchart showing the acquisition of a forwarding policy in a method for processing method applied to a bearer network device according to another embodiment of the present disclosure.

In addition, referring to FIG. 16, in an embodiment, S221 may include but is not limited to the following operations.

At S223, the network slice identifier and the network slice parameters in the first slice service packet are reported to the network controller, so that the network controller configures the forwarding policy according to the network slice identifier and the network slice parameters.

At S224, the forwarding policy sent by the network controller is received.

In an embodiment, after receiving the first slice service packet carrying the network slice identifier and the network slice parameters, the bearer network device can first determine, according to the network slice identifier, whether a network slice service corresponding to the network slice identifier is present in the bearer network. And if no corresponding network slice service is present, the bearer network device can report the network slice identifier and the network slice parameters to the network controller. As such, the network controller configures the forwarding policy according to the network slice identifier and the network slice parameters. Upon completing the configuration of the forwarding policy, the network controller sends the forwarding policy to the bearer network device, so that the bearer network device can acquire the forwarding policy corresponding to the network slice identifier and the network slice parameters. Thereby, the bearer network device can encapsulate and forward the first slice service packet in the subsequent operations according to the forwarding policy.

Figure 17:
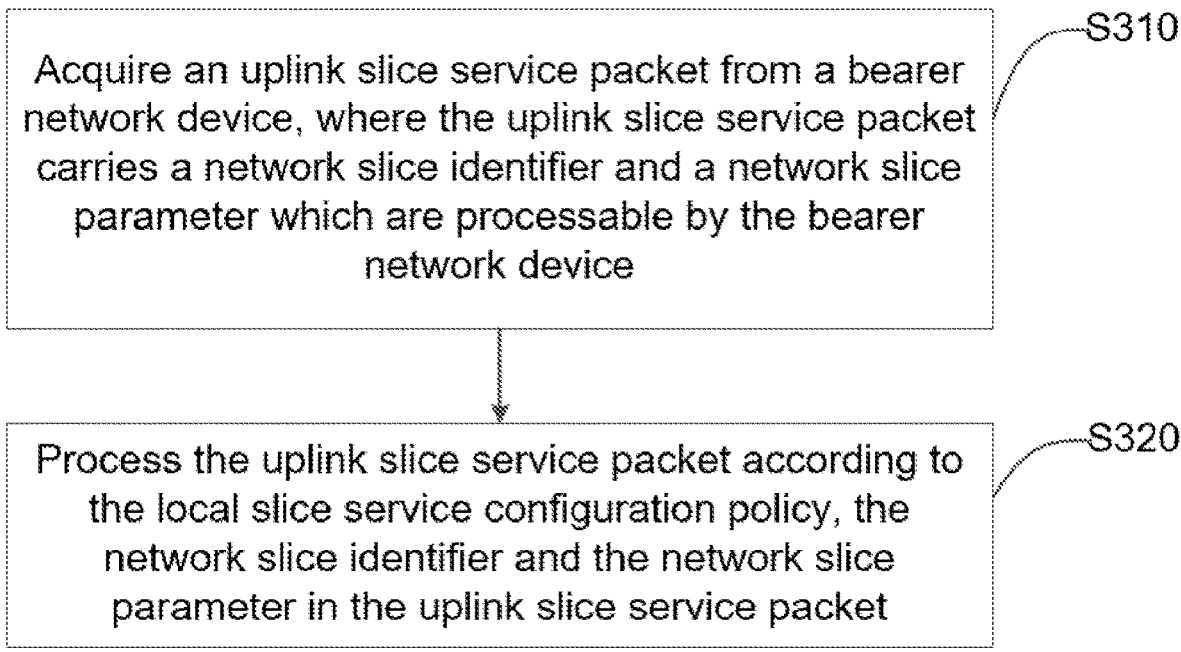
FIG. 17 depicts a flowchart showing a method for information processing applied to a core network device according to an embodiment of the present disclosure.

In addition, as shown in FIG. 17, which depicts a flowchart showing a method for information processing according to another embodiment of the present disclosure. The method is applied to a core network device, such as the core network device 140 in the embodiment shown in FIG. 1. The method includes but is not limited to the following operations.

At S310, an uplink slice service packet is acquired from a bearer network device, where the uplink slice service packet carries a network slice identifier and a network slice parameter which are processable by the bearer network device.

At S320, the uplink slice service packet is processed according to the local slice service configuration policy, the network slice identifier and the network slice parameter in the uplink slice service packet.

In an embodiment, when receiving the uplink slice service packet that carries a network slice identifier and a network slice parameter processable by the bearer network device, from the bearer network device, the core network device may perform related processing on the uplink slice service packet according to a preset local slice service configuration policy, the network slice identifier and the network slice parameter of the uplink slice service packet. For example, processing with an independent User Plane Function (UPF) virtual machine, assigning a high-priority queue for priority processing, etc.

In an embodiment, the network slice identifier may be S-NSSAI. The network slice parameters include, but are not limited to at least one of, the slice isolation type parameters, slice quality requirement parameters, or slice SLA requirement parameters. And the network slice parameters can be appropriately selected according to the actual usage of the terminal device. And this embodiment does not specifically limit this.

In an embodiment, a packet substructure which can be processed by the bearer network device can be newly set in the uplink slice service packet. The packet substructure carries the network slice identifier and the network slice parameters, so that when the core network device receives the uplink slice service packet including the packet substructure, the core network device can parse and acquire the network slice identifier and the network slice parameters from the packet substructure. In this way, the first slice service packet can be processed according to the network slice identifier and the network slice parameters.

In an embodiment, the packet substructure may include a slice identifier field and a slice parameter field, where the network slice identifier is set in the slice identifier field and the network slice parameter is set in the slice parameter field. In addition, the slice parameter field can include multiple parameter subfields, which can be appropriately extended according to the actual situation.

It is worth noting that the packet substructure in the uplink slice service packet in this embodiment has the same structure format and the same meanings for the fields as that in the above-described embodiments as shown in FIGS. 3, 4, 5, 6 and 7. Regarding the structure format and meanings for fields of the packet substructure in the uplink slice service packet in this embodiment, please refer to the relevant descriptions in the embodiments as shown in FIGS. 3, 4, 5, 6, and 7, and which are not repeated here. In addition, the position where the packet substructure is set in the uplink slice service packet in this embodiment, is the same as the position where the packet substructure is set in the uplink slice service packet as described in the embodiments as shown in FIGS. 8, 9, 10, 11, and 12. Regarding the position where the packet substructure is set in the uplink slice service packet in this embodiment, please refer to the relevant descriptions in the embodiments shown in FIGS. 8, 9, 10, 11, and 12, and which are not repeated here.

In an embodiment, by means of the method for information processing including the above S310 and S320, when the core network device receives the uplink slice service packet from the bearer network device, it is indicated that the bearer network device can identify and individually process the network slice identifier and network slice parameters carried by the uplink slice service packet on the forwarding plane. Otherwise, the core network device will not receive the uplink slice service packet. Therefore, it is not necessary for the method for information processing of this embodiment to have cooperative processing of the uplink slice service packet through a complex cross-domain scheduler, so that the complexity of the network slice scheduling system can be reduced.

Referring to FIG. 18, in an embodiment, the method for information processing may further include, but is not limited to, the following operations.

At S330, a downlink slice service packet carrying a network slice identifier and a network slice parameter is sent to a bearer network device, according to the processed uplink slice service packet, so that the bearer network device processes the downlink slice service packet according to the network slice identifier and the network slice parameter in the downlink slice service packet.

In an embodiment, subsequent to step S320, and after the core network device completes processing the uplink slice service packet, the core network device can construct a corresponding downlink slice service packet according to the processed uplink slice service packet. The downlink slice service packet carries the network slice identifier and network slice parameters. Then the core network device can send the downlink slice service packet to the bearer network device. When receiving the downlink slice service packet, the bearer network device can carry out relevant encapsulation and forwarding processing on the downlink slice service packet according to the network slice identifier and network slice parameters carried by the downlink slice service packet. Since the bearer network device can identify and distinguish the information carried by the downlink slice service packet on the forwarding plane, it is not necessary to perform cooperative processing of the downlink slice service packet through a complex cross-domain scheduler, thus reducing the complexity of the network slice scheduling system.

It is worth noting that the downlink slice service packet constructed by the core network device according to the processed uplink slice service packet in this embodiment corresponds to the uplink slice service packet from the bearer network device in the embodiment shown in FIG. 17. Similarly, the downlink slice service packet in this embodiment also includes a packet substructure. And the packet substructure has the same structure format and the same meanings for the fields as those in the above-described embodiments as shown in FIGS. 3, 4, 5, 6, and 7. Regarding the structure format and meanings for fields of the packet substructure in the downlink slice service packet in this embodiment, please refer to the relevant descriptions in the embodiments as shown in FIGS. 3, 4, 5, 6, and 7, and which are not repeated here. In addition, the position where the packet substructure is set in the downlink slice service packet in this embodiment, is the same as the position where the packet substructure is set in the slice service packet as described in the embodiments as shown in FIGS. 8, 9, 10, 11, and 12. Regarding the position where the packet substructure is set in the downlink slice service packet in this embodiment, please refer to the relevant descriptions in the embodiments shown in FIGS. 8, 9, 10, 11, and 12, which are not repeated here.

It should be noted that the network slice identifier and network slice parameters carried by the packet substructure in the downlink slice service packet in this embodiment are consistent with those carried by the packet substructure of the uplink slice service packet in the embodiment shown in FIG. 17.

In addition, as shown in FIG. 19, which depicts a flowchart showing a method for information processing according to another embodiment of the present disclosure. The method is applied to a network system including, a base station, a bearer network device and a core network device. The method includes but is not limited to the following operations.

At S410, the base station acquires slice service information from a terminal device.

At S420, the base station sends an uplink slice service packet carrying a network slice identifier and a network slice parameter to the bearer network device, according to the slice service information, where the network slice identifier and the network slice parameter are processable by the bearer network device.

At S430, the bearer network device forwards the uplink slice service packet to the core network device according to the network slice identifier and network slice parameter in the uplink slice service packet.

At S440, the core network device processes the uplink slice service packet according to the local slice service configuration policy, and the network slice identifier and the network slice parameters in the uplink slice service packet.

Figure 20:
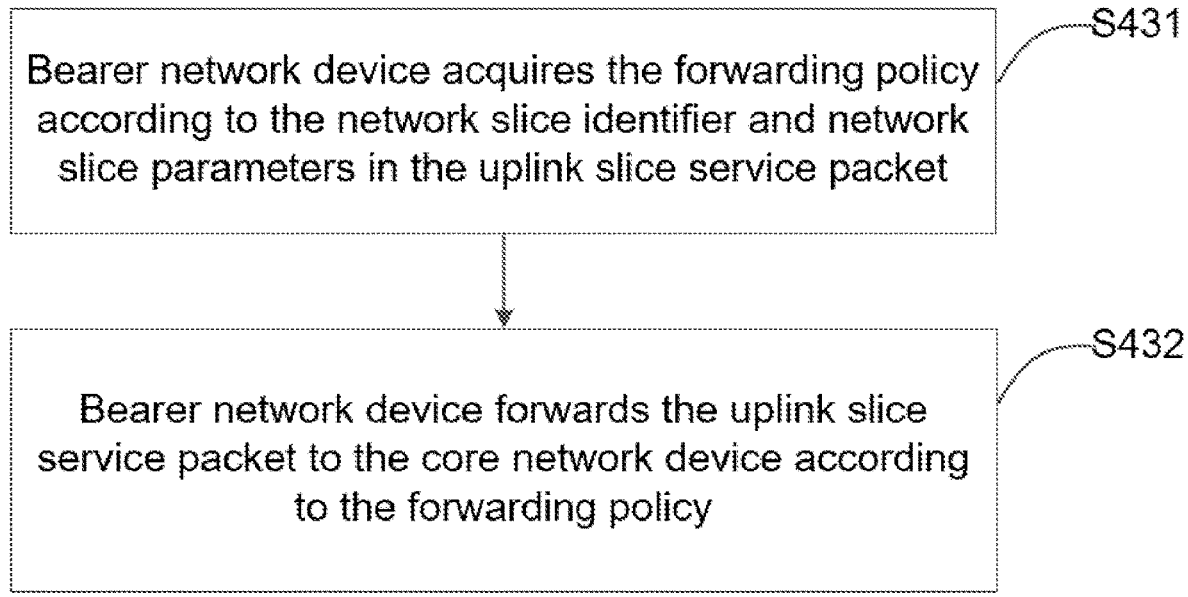
FIG. 20 depicts a flowchart showing forwarding by the bearer network device, the uplink slice service packet to the core network device in the method for information processing applied to the network system according to another embodiment of the present disclosure.

As shown in FIG. 20, in an embodiment, S430 may include, but is not limited to, the following operations.

At S431, the bearer network device acquires the forwarding policy according to the network slice identifier and network slice parameters in the uplink slice service packet.

At S432: the bearer network device forwards the uplink slice service packet to the core network device according to the forwarding policy.

Figure 21:
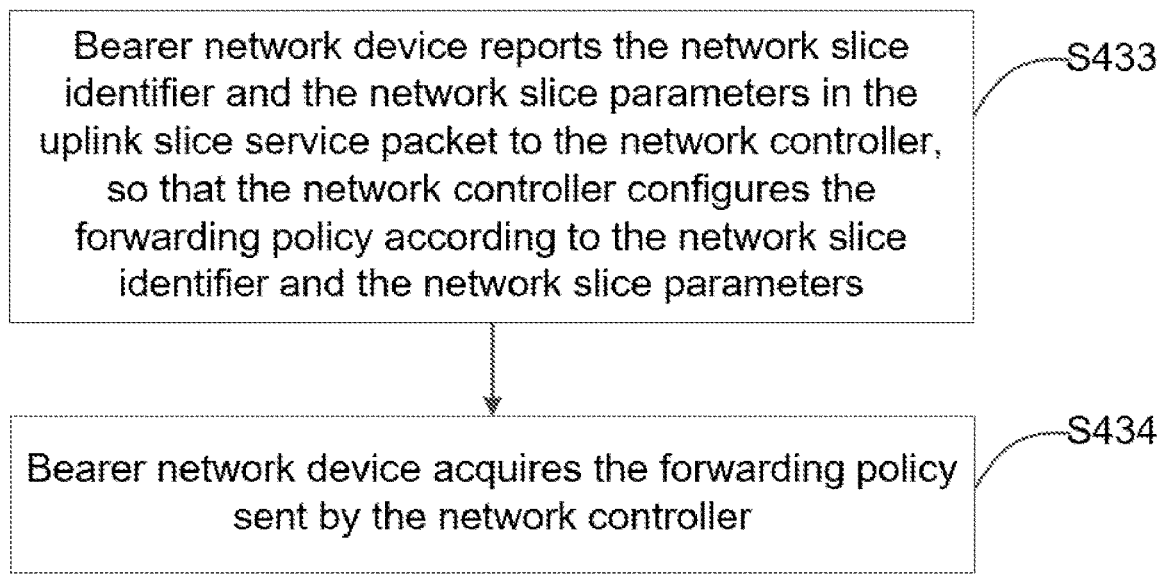
FIG. 21 depicts a flowchart showing the acquisition of a forwarding policy in a method for information processing applied to a network system according to another embodiment of the present disclosure.

As shown in FIG. 21, in an embodiment, S431 may include, but is not limited to, the following operations.

At S433, the bearer network device reports the network slice identifier and the network slice parameters in the uplink slice service packet to the network controller, so that the network controller configures the forwarding policy according to the network slice identifier and the network slice parameters.

At S434, the bearer network device acquires the forwarding policy sent by the network controller.

Figure 22:
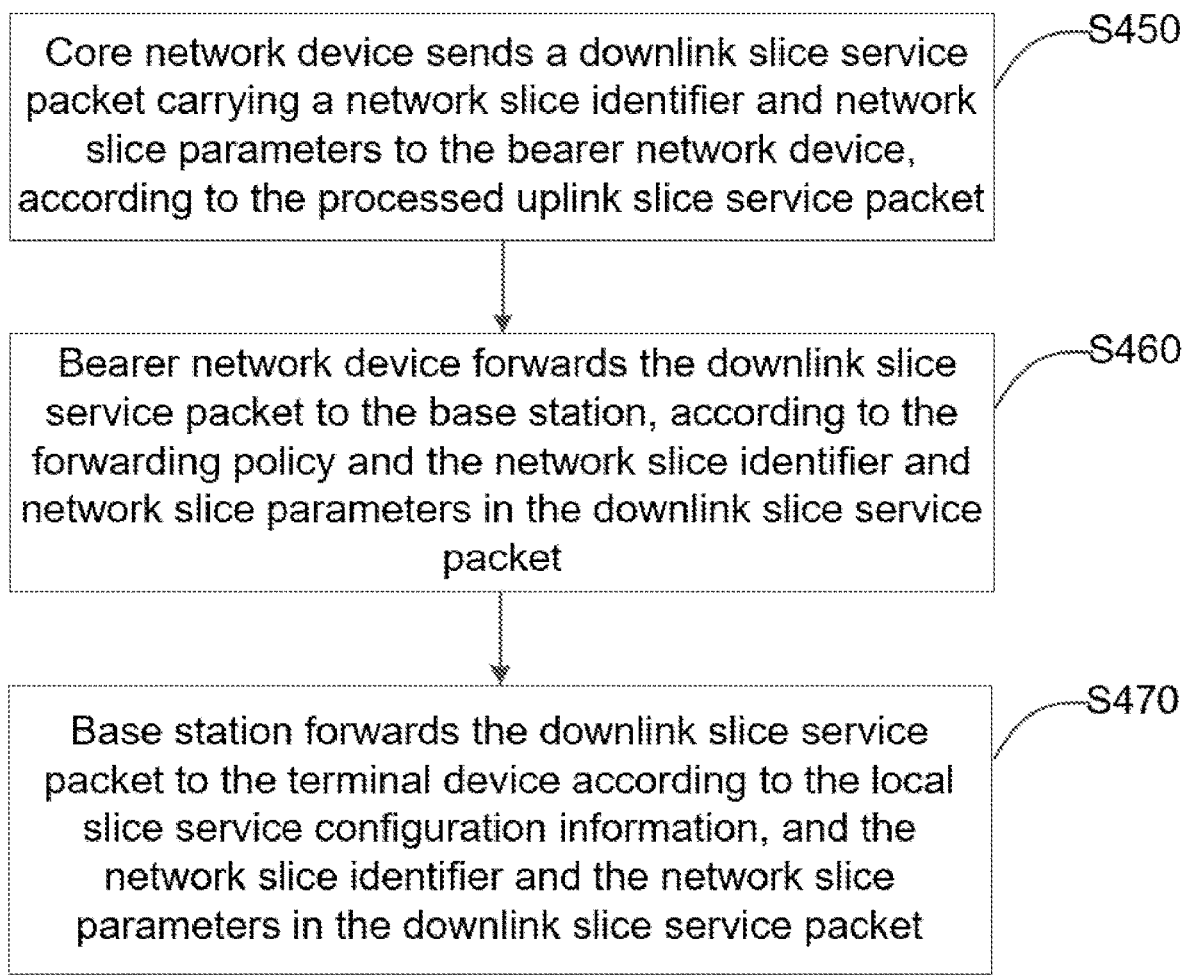
FIG. 22 depicts a flowchart showing a method for information processing applied to a network system according to another embodiment of the present disclosure.

As shown in FIG. 22, in an embodiment, after step S440, the method for information processing may further include, but is not limited to, the following operations.

At S450, the core network device sends a downlink slice service packet carrying a network slice identifier and network slice parameters to the bearer network device, according to the processed uplink slice service packet.

At S460, the bearer network device forwards the downlink slice service packet to the base station, according to the forwarding policy and the network slice identifier and network slice parameters in the downlink slice service packet.

At S470, the base station forwards the downlink slice service packet to the terminal device according to the local slice service configuration information, and the network slice identifier and the network slice parameters in the downlink slice service packet.

In an embodiment, the network slice identifier may be S-NSSAI. The network slice parameters include, but are not limited to at least one of, slice isolation type parameters, slice quality requirement parameters, or slice SLA requirement parameters. And the network slice parameters can be appropriately selected according to the actual usage of the terminal device. And this embodiment does not specifically limit this.

In an embodiment, a new packet substructure which is processable by the bearer network device, can be set in both the uplink and downlink slice service packets. The packet substructure carries the network slice identifier and the network slice parameters, so that when the bearer network device receives the uplink/downlink slice service packet including the packet substructure, the bearer network device can parse and acquire the network slice identifier and the network slice parameters from the packet substructure. In this way, the uplink/downlink slice service packet can be identified and individually processed according to the network slice identifier and the network slice parameters.

In an embodiment, the packet substructure may include a slice identifier field and a slice parameter field, where the network slice identifier is set in the slice identifier field and the network slice parameter is set in the slice parameter field. In addition, the slice parameter field can include multiple parameter subfields, which can be appropriately extended according to the actual situation.

It is worth noting that in the above-described method for information processing applied to the network system, the packet substructures in both the uplink and downlink slice service packets have the same structural format and the same meanings for the fields as those in the above-described embodiments as shown in FIGS. 3, 4, 5, 6, and 7. Regarding the packet substructures in both the uplink and downlink slice service packet in the above method for information processing applied to the network system, please refer to the relevant descriptions in the embodiments shown in FIGS. 3, 4, 5, 6, and 7, and which will not repeat here. In addition, in the method for information processing applied to the network system, the position where the packet substructure of the uplink slice service packet is set in the uplink slice service packet and the position where the packet substructure of the downlink slice service packet is set in the downlink slice service packet, are the same as the position where the packet substructure is set in the slice service packet in the embodiments shown in FIGS. 8, 9, 10, 11, and 12. Regarding the position where the packet substructure of the uplink slice service packet is set in the uplink slice service packet, and the position where the packet substructure in the downlink slice service packet is set in the downlink slice service packet, in the above method for information processing applied to the network system, please refer to the relevant descriptions in the embodiments shown in FIGS. 8, 9, 10, 11 and 12, and which will not repeat here.

It should be noted that the method for information processing applied to the network system in the above-mentioned embodiment is based on the same inventive concept as the method for information processing applied to the base station in the above-mentioned embodiment, the method for information processing applied to the bearer network device in the above-mentioned embodiment, and the method for information processing applied to the core network device in the above-mentioned embodiment, and the difference between those method lies merely in that the entity which performs the method. As mentioned above, the method for information processing applied to the base station in the above-mentioned embodiment focuses on the base station, the method for information processing applied to the bearer network device in the above-mentioned embodiment focuses on the bearer network device, and the method for information processing applied to the core network device in the above-mentioned embodiment focuses on the core network device. And the method for information processing applied to the network system in the above-mentioned embodiments focuses on the network system including the base station, the bearer network device and the core network device. Therefore, the above four methods have the same beneficial effects, that is, the bearer network device can process the slice service packet according to the network slice identifier and the network slice parameters, which are processable by the bearer network device, carried in the slice service packet on the forwarding plane, thus reducing the complexity of the network slice scheduling system.

The process of the method for information processing in the above-described embodiments will be illustrated with the following example embodiment for better understanding.

Example Embodiment One

This example embodiment is directed to an extension header newly defined based on IPv6 header to provide a packet substructure with network slice identifier and network slice parameters.

Suppose it is necessary to initiate a slice service for vertical industry application in a 5G base station. The service packet of the base station is encapsulated with IPv6 packet. This industry is for remote control, which requires slice to occupy independent hard resources and belongs to delay-sensitive service (for example, the delay is required to be within 5 ms and the jitter is within 3 us), but the bandwidth requirement is only 20M. At the same time, the bearer network provides different service isolation capabilities with L3 VPN, SR-MPLS and FlexE technologies, and achieves service scheduling with a centralized controller. Under the above conditions, the base station can define a packet substructure, which includes a network slice identifier field, a slice isolation type field, a slice quality requirement field, and a slice SLA requirement field, or the like. In addition, the base station can newly define an extension header "SliceExt Header" in the IPv6 header, and set the above packet substructure in the "SliceExt Header".

Figure 23:
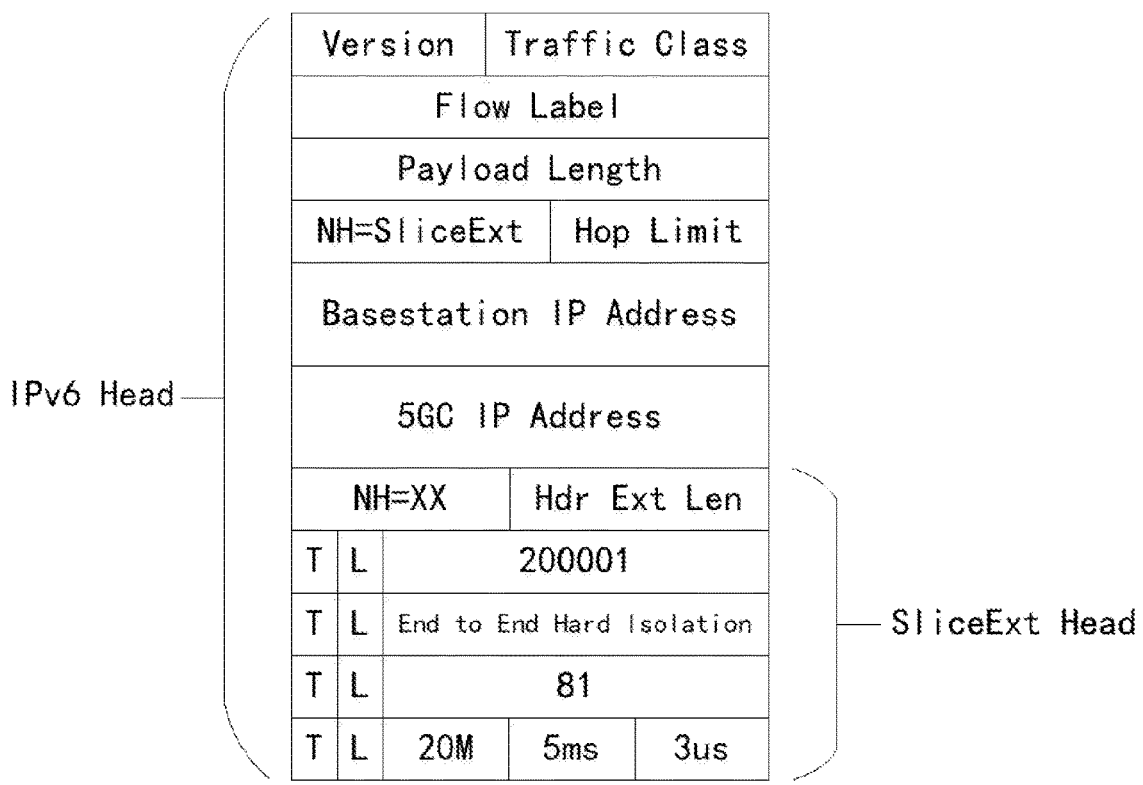
FIG. 23 depicts a schematic diagram showing an IPv6 header according to an embodiment of the present disclosure.

When the base station receives the slice service request from the terminal device, the base station can complete the corresponding slice service processing according to the slice service request (for example, allocate hard isolated spectrum resources, set the slice priority processing level, etc.). When the base station sends the slice service packet to the core network device after completing the slice service processing, as shown in FIG. 23, the base station can write the following information into the packet substructure of the IPv6 header according to the slice service request from the terminal device: write "200001" (i.e., Slice ID=200001) in the network slice identifier field, write "End to End Hard Isolation" into the slice isolation type field (i.e., isolation type=End To End Hard Isolation), write "81" into the slice quality requirement field (i.e., QoS Identifier=81), and write "20M", "5 ms", and "3 us" into the slice SLA requirement fields (i.e., BandWidth=20M, Delay=5 ms, Jitter=3 us) respectively. When the base station completes the encapsulation of the above information to acquire the uplink slice service packet, the source address of the uplink slice service packet is the IP address of the base station and the destination address is the IP address of the core network device, such as the IP address of the User Plane Function (UPF). At this time, the base station can send the uplink slice service packet to the bearer network device, and the bearer network device forwards the uplink slice service packet to the core network device.

After receiving the uplink slice service packet from the base station, the edge device at the ingress port side of the bearer network may parse and acquire the information such as network slice identifier, slice isolation type parameters, slice quality requirements parameters and slice SLA requirements parameters from the uplink slice service packet, and perform a determination whether a slice service corresponding to the network slice identifier is present in the current bearer network according to the network slice identifier, and perform different processing according to different results of the determination. In particular, if a corresponding slice service is present, the edge device at the ingress port side of the bearer network forwards the uplink slice service packet according to a preset forwarding policy, slice isolation type parameters, slice quality requirements parameters, slice SLA requirements parameters and other information, such as encapsulating the uplink slice service packet with L3VPN and SR-MPLS, and mapping the same to the FlexE Channel. And thus the intermediate nodes of the bearer network can configure and forward the uplink slice service packet according to the FlexE Channel. And if no corresponding slice service is present, the edge device at the ingress port side of the bearing network may report information such as network slice identifier, slice isolation type parameters, slice quality requirements parameters and slice SLA requirements parameters to the centralized controller. After receiving the information, the centralized controller can schedule a service according to the requirements of the slice service, and create a new L3VPN service to carry the slice service based on this service scheduling. The centralized controller then assigns a dedicated SR-MPLS tunnel, and achieves end-to-end hard isolation and provides low delay and low jitter forwarding performance with the FlexE Channel mode adopted in the physical layer. Then, the centralized controller sends the corresponding configuration to the edge device at the ingress port side of the bearer network, so that the edge device at the ingress port side of the bearer network binds the network slice identifier (identifier "200001" as shown in FIG. 23) with the newly-built L3VPN service and forwards the uplink slice service packet.

After receiving the uplink slice service packet from the edge device at the ingress port side of the bearer network, the edge device at the egress port side of the bearer network can remove the L3VPN encapsulation or the SR-MPLS encapsulation in the uplink slice service packet, restore the uplink slice service packet to the original uplink slice service packet sent by the base station, and forward the same to the core network device.

After receiving the uplink slice service packet forwarded by the edge device at the egress port side of the bearer network, the core network device can parse and acquire the information such as the network slice identifier, slice isolation type parameters, slice quality requirements parameters and slice SLA requirements parameters from the uplink slice service packet, and carry out corresponding processing on the uplink slice service packet with the local slice service configuration policy in the core network device (such as processing with an independent UPF virtual machine, assigning a high-priority queue for priority processing, etc.).

Figure 24:
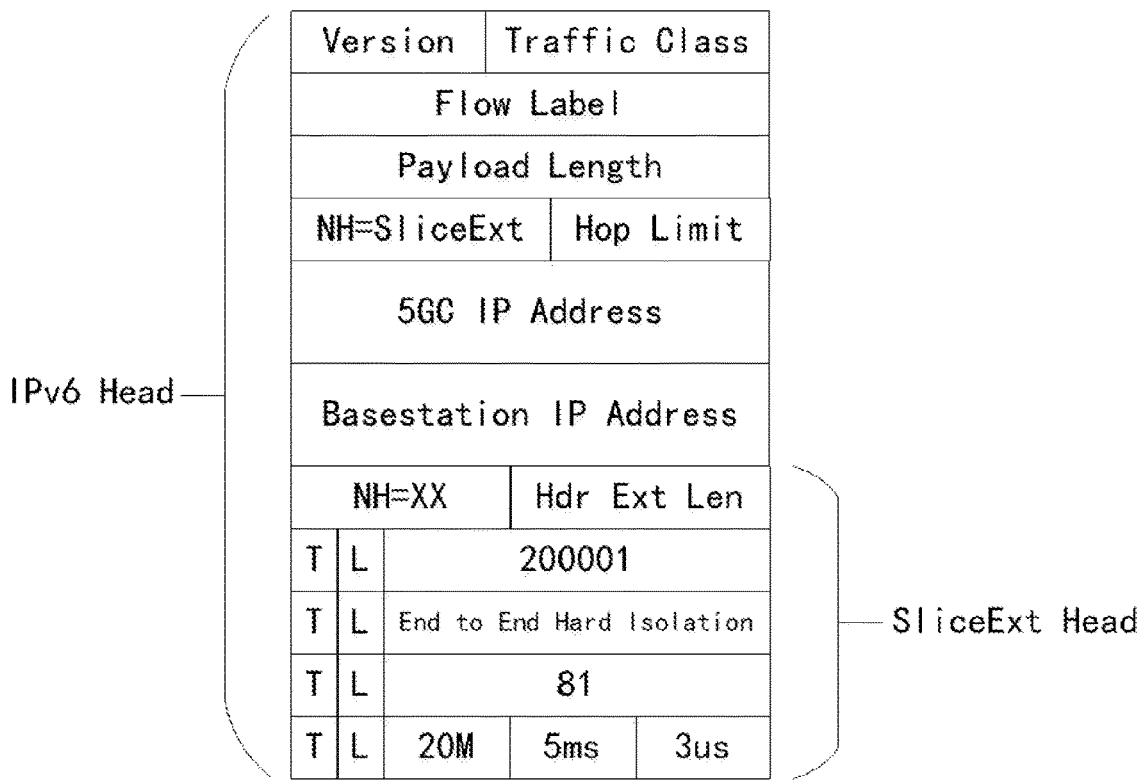
FIG. 24 depicts a schematic diagram showing an IPv6 header according to another embodiment of the present disclosure.

When the core network device sends the slice service packet to the base station after completing the processing on slice service, as shown in FIG. 24, the core network device can write the following information into the packet substructure of the IPv6 header according to the processed slice service: write "200001" (i.e., Slice ID=200001) in the network slice identifier field, write "End to End Hard Isolation" into the slice isolation type field (i.e., isolation type=End To End Hard Isolation), write "81" into the slice quality requirement field (i.e., QoS Identifier=81), and write "20M", "5 ms", and "3 us" into the slice SLA requirements fields (i.e., BandWidth=20M, Delay=5 ms, Jitter=3 us) respectively. When the core network device completes the encapsulation of the above information to acquire the downlink slice service packet, the source address of the downlink slice service packet is the IP address of the core network device (e.g., the IP address of UPF) and the destination address is the IP address of the base station. At this time, the core network device can send the downlink slice service packet to the bearer network device which will forward the downlink slice service packet to the base station.

After receiving the downlink slice service packet from the core network device, the bearer network device can carry out relevant processing on the downlink slice service packet. The processing process is similar to that of the above-described processing by the bearer network device on the uplink slice service packet (including the processing process of the uplink slice service packet by the edge device at the ingress port side of the bearer network and the processing process of the uplink slice service packet by the edge device at the egress port side of the bearer network). The only difference is that the object being processed now becomes the downlink slice service packet. Therefore, the processing process of the downlink slice service packet by the bearer network device can refer to the processing process of the uplink slice service packet by the edge device at the ingress port side of the bearer network and the processing process of the uplink slice service packet by the edge device at the egress port side of the bearer network, and which is not repeated here.

After receiving the downlink slice service packet forwarded by the edge device at the egress port side of the bearer network, the base station can parse and acquire the information such as network slice identifier, slice isolation type parameters, slice quality requirements parameters and slice SLA requirements parameters from the downlink slice service packet, and process the downlink slice service packet in conjunction with the local slice service configuration information in the base station. When completing the processing on the downlink slice service packet, the base station can forward the processed downlink slice service packet to the terminal device, such that the terminal device can achieve network access based on the network slice.

Example Embodiment Two

This example embodiment is directed to a packet substructure carrying a network slice identifier and a network slice parameter that is provided based on a destination address in IPv6 header and a newly defined extension header.

This example embodiment is similar to example embodiment one above. The base station adopts IPv6 packet encapsulation, and the end-to-end processing process from the base station to the core network device is the same as that in the example embodiment one above, but the only difference is that the structure and encapsulation of slice service packets are different. In particular, the destination address field of the slice service packet in this example embodiment contains the addressing information of the destination node (such as the addressing information of the core network device: Perfix and Node SID) and the network slice identifier (i.e. Slice ID), while the extension header of the slice service packet only contains information such as slice isolation type parameters, slice quality requirements parameters and slice SLA requirements parameters, and no longer contains the network slice identifier (i.e. Slice ID).

Example Embodiment Three

This example embodiment is directed to an extension header newly defined based on IPv4 header to provide a packet substructure with network slice identifier and network slice parameters. This example embodiment is similar to example embodiment one above. The end-to-end processing process from the base station to the core network device is the same as that in the example embodiment one above, but the only difference is that the base station adopts IPv4 packet encapsulation, and the structure and encapsulation of slice service packets are different.

Example Embodiment Four

This example embodiment is directed to a packet substructure carrying a network slice identifier and a network slice parameter which is provided based on the NSH encapsulation.

This example embodiment is similar to example embodiment one above. And the end-to-end processing process from the base station to the core network device is the same as that in the example embodiment one above, but the only difference is that the structure and encapsulation of slice service packets are different. In particular, the slice service packet is encapsulated with NSH according to the standard RFC8300, and the network slice identifier (i.e., Slice ID) is written into the SPI field in the NSH encapsulation, while the slice isolation type parameters, slice quality requirements parameters and slice SLA requirements parameters are written into the Context Header field in the NSH encapsulation.

Example Embodiment Five

This example embodiment is directed to a packet substructure carrying a network slice identifier and a network slice parameter which is provided based on the GENEVE encapsulation.

This example embodiment is similar to example embodiment one above. And the end-to-end processing process from the base station to the core network device is the same as that in the example embodiment one above, but the only difference is that the structure and encapsulation of slice service packets are different. In particular, the slice service packet is encapsulated with GENEVE according to the standard draft-ietf-nvo3-geneve-16, and the network slice identifier (i.e., Slice ID) is written into the VNI field in the GENEVE encapsulation, while the slice isolation type parameters, slice quality requirements parameters and slice SLA requirements parameters are written into the variable length options field in the GENEVE encapsulation.

In addition, an embodiment of the present disclosure provides a base station, which includes a memory, a processor, and a computer program stored in the memory and executable by the processor.

The processor and the memory may be connected by a bus or other means.

It should be noted that the base station in this embodiment can be implemented as the base station 110 in the system architecture of the embodiment shown in FIG. 1. The base station in this embodiment and the base station 110 in the system architecture of the embodiment shown in FIG. 1 belong to the same inventive concept, so these embodiments have the same implementation principle and technical effect, and which will not be described in detail here.

Non-transitory software programs and instructions for the method for information processing in the above embodiments are stored in a memory which, when executed by a processor, causes the processor to carry out the method for information processing, e.g., S110 to S120 described in conjunction with FIG. 2, or S130 and S140 described in conjunction with FIG. 13.

In addition, an embodiment of the present application further provides a bearer network device, which includes a memory, a processor, and a computer program stored in the memory and executable by the processor.

The processor and the memory may be connected by a bus or other means.

It should be noted that the bearer network device in this embodiment can be implemented as the first bearer network device 120 or the second bearer network device 130 in the system architecture of the embodiment shown in FIG. 1. The bearer network device in this embodiment and the first bearer network device 120 and the second bearer network device 130 in the system architecture of the embodiment shown in FIG. 1 belong to the same inventive concept, so these embodiments have the same implementation principles and technical effects, and which will not be described in detail here.

Non-transitory software programs and instructions for the method for information processing in the above embodiments are stored in a memory which, when executed by a processor, causes the processor to carry out the method for information processing, e.g., S210 to S220 described in conjunction with FIGS. 14, S221 to S222 described in conjunction with FIG. 15, or S223 to S224 described in conjunction with FIG. 16.

In addition, an embodiment of the present application further provides a core network device, which includes a memory, a processor, and a computer program stored in the memory and executable by the processor.

The processor and the memory may be connected by a bus or other means.

It should be noted that the core network device in this embodiment can be implemented as the core network device 140 in the system architecture of the embodiment shown in FIG. 1. The core network device in this embodiment and the core network device 140 in the system architecture of the embodiment shown in FIG. 1 belong to the same inventive concept, so these embodiments have the same implementation principle and technical effect, and which will not be described in detail here.

Non-transitory software programs and instructions for the method for information processing in the above embodiments are stored in a memory which, when executed by a processor, causes the processor to carry out the method for information processing, e.g., S310 to S320 described in conjunction with FIG. 17, or S330 described in conjunction with FIG. 18.

The above-described embodiments are only schematic, in which the units illustrated as separate components may or may not be physically separated, that is, the device may be located in one place or distributed over several network units. Some or all of the modules can be selected according to the practical needs to achieve the purpose of this embodiment.

In addition, an embodiment of the present disclosure further provides a computer-readable storage medium, which stores a computer-executable instruction which, when executed by a processor or controller, for example, by a processor in the above-described embodiment directed to a base station, causes the processor to carry out the method for information processing above, e.g., S110 to S120 described in conjunction with FIG. 2, or S130 to S140 described in conjunction with FIG. 13. Alternatively, the computer-executable instruction which, when executed by a processor in the above-described embodiment directed to a bearer network device, causes the processor to carry out S210 to S220 described in conjunction with FIGS. 14, S221 to S222 described in conjunction with FIG. 15, or S223 to S224 described in conjunction with FIG. 16. Alternatively, the computer-executable instruction which, when executed by a processor in the above-described embodiment directed to a core network device, causes the processor to carry out S310 to S320 described in conjunction with FIG. 17, or S330 described in conjunction with FIG. 18.

An embodiment of the present disclosure includes, acquiring, by a base station, slice service information from a terminal device; sending an uplink slice service packet carrying a network slice identifier and a network slice parameter to a bearer network device, according to the slice service information, so that the bearer network device processes the uplink slice service packet according to the network slice identifier and network slice parameter in the uplink slice service packet, where both the network slice identifier and network slice parameter are processable by the bearer network device. According to the scheme provided by some embodiments of the present disclosure, when the base station acquires the slice service information from the terminal device, the base station sends an uplink slice service packet carrying the network slice identifier and the network slice parameters to the bearer network device according to the slice service information. Since both the network slice identifier and the network slice parameters are processable by the bearer network device, when the bearer network device receives the uplink slice service packet, the bearer network device can identify and individually process the uplink slice service packet on the forwarding plane according to the network slice identifier and the network slice parameter in the uplink slice service packet. And it is not necessary to achieve the cooperative processing of the uplink slice service packet through a complex cross-domain scheduler, thereby reducing the complexity of the network slice scheduling system.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description for some embodiments of the present application, but the present application is not limited to the above embodiments. Those having ordinary skills in the art can make various equivalent modifications or substitutions without departing the scope of the present application, and these equivalent modifications or substitutions are within the scope defined by the claims of the present application.

What is claimed is:

1. A method for information processing, comprising,
acquiring slice service information from a terminal device;
sending an uplink slice service packet carrying a network slice identifier and a network slice parameter to a bearer network device, according to the slice service information, so that the bearer network device processes the uplink slice service packet according to the network slice identifier and network slice parameter in the uplink slice service packet,
wherein the uplink slice service packet comprises a packet substructure that is processable by the bearer network device, the packet substructure carries the network slice identifier and the network slice parameter, and the packet substructure contained in the uplink slice service packet is designed to be set in any one of, an IPV6 header, an IPV4 header, a Network Service header (NSH) or a generic network virtualization encapsulation (GENEVE) in the uplink slice service packet, such that both the network slice identifier and network slice parameter are processable by the bearer network device.

2. The method of claim 1, further comprising,
acquiring a downlink slice service packet from the bearer network device, wherein the downlink slice service packet corresponds to the uplink slice service packet, and the downlink slice service packet carries the network slice identifier and the network slice parameter; and
processing the downlink slice service packet according to a local slice service configuration information, the network slice identifier and the network slice parameter in the downlink slice service packet.

3. The method of claim 2, wherein the downlink slice service packet comprises the packet, and
the packet substructure carries the network slice identifier and the network slice parameter.

4. The method of claim 3, wherein
the packet substructure contained in the downlink slice service packet is set in any one of, an IPV6 header, an IPV4 header, an NSH header or a GENEVE in the downlink slice service packet.

5. The method of claim 1, wherein the network slice parameter comprises at least one of,
a slice isolation type parameter,
a slice quality requirement parameter, or
a slice Service-Level Agreement (SLA) requirement parameter; and
wherein, the slice isolation type parameter is indicated by an Isolation Type Type Length Value (TLV) comprising a field of "Isolation Type", which is a parameter indicating the slice isolation type, and a value of the field of "Isolation Type" is one of: end-to-end hard isolation, hop-by-hop hard isolation, tunnel layer soft isolation, Virtual Private Network (VPN) isolation combined with tunnel sharing, or VPN sharing;
the slice quality requirement parameter is indicated by a Quality of Service (Qos) Identifier TLV comprising a field of "QoS Identifier"; and
the SLA requirement parameter is indicated by an SLA TLV structure comprising at least one field of:
"Bandwidth", which is indicative of bandwidth requirement of a slice service;
"Delay", which is indicative of delay requirement of the slice service; or
"Jitter", which is indicative of jitter requirement of the slice service.

6. A method for information processing, comprising,
acquiring a first slice service packet from a base station or a core network device, wherein the first slice service packet carries a network slice identifier and a network slice parameter, and wherein the first slice service packet comprises a packet substructure that is processable by the bearer network device, the packet substructure carries the network slice identifier and the network slice parameter, and the packet substructure contained in the first slice service packet is designed to be set in any one of, an IPV6 header, an IPV4 header, a Network Service header (NSH) or a generic network virtualization encapsulation (GENEVE) in the first slice service packet, such that both the network slice identifier and the network slice parameter are processable by a bearer network device; and
processing the first slice service packet according to the network slice identifier and the network slice parameter in the first slice service packet.

7. The method of claim 6, wherein processing the first slice service packet according to the network slice identifier and the network slice parameter in the first slice service packet comprises,
acquiring a forwarding policy according to the network slice identifier and network slice parameter in the first slice service packet; and
processing the first slice service packet according to the forwarding policy.

8. The method of claim 7, wherein acquiring the forwarding policy according to the network slice identifier and the network slice parameter in the first slice service packet comprises,
reporting the network slice identifier and the network slice parameter in the first slice service packet to a network controller, so that the network controller configures the forwarding policy according to the network slice identifier and the network slice parameter; and
acquiring the forwarding policy sent by the network controller.

9. The method of claim 6, wherein the network slice parameter comprises at least one of,
a slice isolation type parameter,
a slice quality requirement parameter, or
a slice SLA requirement parameter; and
wherein, the slice isolation type parameter is indicated by an Isolation Type Type Length Value (TLV) comprising a field of "Isolation Type", which is a parameter indicating the slice isolation type, and a value of the field of "Isolation Type" is one of: end-to-end hard isolation, hop-by-hop hard isolation, tunnel layer soft isolation, Virtual Private Network (VPN) isolation combined with tunnel sharing, or VPN sharing;
the slice quality requirement parameter is indicated by a Quality of Service (Qos) Identifier TLV comprising a field of "QoS Identifier"; and
the SLA requirement parameter is indicated by an SLA TLV structure comprising at least one field of:
"Bandwidth", which is indicative of bandwidth requirement of a slice service;
"Delay", which is indicative of delay requirement of the slice service; or
"Jitter", which is indicative of jitter requirement of the slice service.

10. A method for information processing, comprising,
acquiring an uplink slice service packet from a bearer network device, wherein the uplink slice service packet carries a network slice identifier and a network slice parameter, and wherein the first slice service packet comprises a packet substructure that is processable by the bearer network device, the packet substructure carries the network slice identifier and the network slice parameter, and the packet substructure contained in the first slice service packet is designed to be set in any one of, an IPV6 header, an IPV4 header, a Network Service header (NSH) or a generic network virtualization encapsulation (GENEVE) in the first slice service packet, such that both the network slice identifier and the network slice parameter are processable by a bearer network device; and
processing the uplink slice service packet according to a local slice service configuration policy, and the network slice identifier and the network slice parameter in the uplink slice service packet.

11. The method of claim 10, wherein after processing the uplink slice service packet, the method further comprises,
sending a downlink slice service packet carrying the network slice identifier and the network slice parameter to the bearer network device, according to the processed uplink slice service packet, so that the bearer network device processes the downlink slice service packet according to the network slice identifier and the network slice parameter in the downlink slice service packet.

12. The method of claim 11, wherein the downlink slice service packet comprises the packet substructure that is processable by the bearer network device.

13. The method of claim 12, wherein
the packet substructure contained in the downlink slice service packet is set in any one of,
an IPV6 header,
an IPv4 header,
an NSH header, or
a GENEVE in the downlink slice service packet.

14. The method of claim 10, wherein the network slice parameter comprises at least one of,
a slice isolation type parameter,
a slice quality requirement parameter, or
a slice SLA requirement parameter; and
wherein, the slice isolation type parameter is indicated by an Isolation Type Type Length Value (TLV) comprising a field of "Isolation Type", which is a parameter indicating the slice isolation type, and a value of the field of "Isolation Type" is one of: end-to-end hard isolation, hop-by-hop hard isolation, tunnel layer soft isolation, Virtual Private Network (VPN) isolation combined with tunnel sharing, or VPN sharing;
the slice quality requirement parameter is indicated by a Quality of Service (Qos) Identifier TLV comprising a field of "QoS Identifier"; and
the SLA requirement parameter is indicated by an SLA TLV structure comprising at least one field of:
"Bandwidth", which is indicative of bandwidth requirement of a slice service;
"Delay", which is indicative of delay requirement of the slice service; or
"Jitter", which is indicative of jitter requirement of the slice service.

15. A non-transitory computer-readable storage medium storing a computer-executable instruction which, when executed by a processor causes the processor to carry out a method for information processing, comprising,
acquiring slice service information from a terminal device;
sending an uplink slice service packet carrying a network slice identifier and a network slice parameter to a bearer network device, according to the slice service information, so that the bearer network device processes the uplink slice service packet according to the network slice identifier and network slice parameter in the uplink slice service packet,
wherein the uplink slice service packet comprises a packet substructure that is processable by the bearer network device, the packet substructure carries the network slice identifier and the network slice parameter, and the packet substructure contained in the uplink slice service packet is designed to be set in any one of, an IPV6 header, an IPV4 header, a Network Service header (NSH) or a generic network virtualization encapsulation (GENEVE) in the uplink slice service packet, such that both the network slice identifier and network slice parameter are processable by the bearer network device; or,
the computer-executable instruction, when executed by a processor causes the processor to carry out a method for information processing, comprising,
acquiring a first slice service packet from a base station or a core network device, wherein the first slice service packet carries a network slice identifier and a network slice parameter, and wherein the first slice service packet comprises a packet substructure that is processable by the bearer network device, the packet substructure carries the network slice identifier and the network slice parameter, and the packet substructure contained in the first slice service packet is set in any one of, an IPV6 header, an IPV4 header, a Network Service header (NSH) or a generic network virtualization encapsulation (GENEVE) in the first slice service packet, such that both the network slice identifier and the network slice parameter are processable by a bearer network device; and
processing the first slice service packet according to the network slice identifier and the network slice parameter in the first slice service packet; or,
the computer-executable instruction, when executed by a processor causes the processor to carry out a method for information processing, comprising,
acquiring an uplink slice service packet from a bearer network device, wherein the uplink slice service packet carries a network slice identifier and a network slice parameter, and wherein the first slice service packet comprises a packet substructure that is processable by the bearer network device, the packet substructure carries the network slice identifier and the network slice parameter, and the packet substructure contained in the first slice service packet is designed to be set in any one of, an IPV6 header, an IPV4 header, a Network Service header (NSH) or a generic network virtualization encapsulation (GENEVE) in the first slice service packet, such that both the network slice identifier and the network slice parameter are processable by a bearer network device; and
processing the uplink slice service packet according to a local slice service configuration policy, and the network slice identifier and the network slice parameter in the uplink slice service packet.

\* \* \* \* \*